(12) United States Patent
Ramsay et al.

(10) Patent No.: US 7,907,762 B2
(45) Date of Patent: *Mar. 15, 2011

(54) METHOD OF CREATING A DIVERGENCE TRANSFORM FOR IDENTIFYING A FEATURE OF INTEREST IN HYPERSPECTRAL DATA

(75) Inventors: Thomas E. Ramsay, Leesburg, VA (US); Eugene B. Ramsay, Tucson, AZ (US); Gerard Felteau, Reston, VA (US); Victor Hamilton, Ashburn, VA (US); Martin Richard, Boucherville (CA); Anatoliy Fesenko, Herndon, VA (US); Oleksandr Andrushchenko, Herndon, VA (US)

(73) Assignee: Guardian Technologies International, Inc., Herndon, VA (US)

( * ) Notice: Subject to any disclaimer, the term of this patent is extended or adjusted under 35 U.S.C. 154(b) by 311 days.

This patent is subject to a terminal disclaimer.

(21) Appl. No.: 12/014,034

(22) Filed: Jan. 14, 2008

(65) Prior Publication Data

US 2009/0175526 A1     Jul. 9, 2009

Related U.S. Application Data

(63) Continuation of application No. 11/374,610, filed on Mar. 14, 2006, now abandoned, which is a continuation-in-part of application No. 11/136,406, filed on May 25, 2005, now Pat. No. 7,496,218, and a continuation-in-part of application No. 11/136,526, filed on May 25, 2005, now Pat. No. 7,492,937.

(60) Provisional application No. 60/574,220, filed on May 26, 2004, provisional application No. 60/574,221, filed on May 26, 2004, provisional application No. 60/578,872, filed on Jun. 14, 2004, provisional application No. 60/661,477, filed on Mar. 15, 2005.

(51) Int. Cl.
*G06K 9/00* (2006.01)
*G06K 9/34* (2006.01)
*G06K 9/20* (2006.01)
*G06K 9/36* (2006.01)

(52) U.S. Cl. ..... 382/128; 382/173; 382/282; 356/237.1; 348/86; 348/125

(58) Field of Classification Search .......... 382/128–134, 382/173, 282; 356/237.1–237.6; 348/86–95, 348/125–134
See application file for complete search history.

(56) References Cited

U.S. PATENT DOCUMENTS 5,970,164 A * 10/1999 Bamberger et al. ........... 382/128
* cited by examiner

*Primary Examiner* — Aaron W Carter
(74) *Attorney, Agent, or Firm* — Rene A. Vazquez

(57) ABSTRACT

A system and method for identifying objects of interest in image data is provided. The present invention utilizes principles of Iterative Transformational Divergence in which objects in images, when subjected to special transformations, will exhibit radically different responses based on the physical, chemical, or numerical properties of the object or its representation (such as images), combined with machine learning capabilities. Using the system and methods of the present invention, certain objects that appear indistinguishable from other objects to the eye or computer recognition systems, or are otherwise almost identical, generate radically different and statistically significant differences in the image describers (metrics) that can be easily measured.

40 Claims, 42 Drawing Sheets
(34 of 42 Drawing Sheet(s) Filed in Color)

LOGARITHMIC

EXPONENTIAL

HYPERBOLIC OR PARABOLIC

NODAL POINTS

RADICAL DEPARTURE

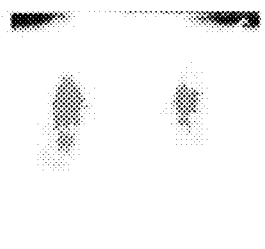 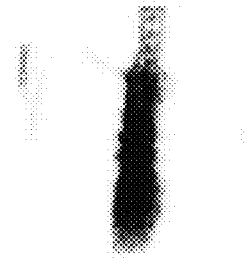 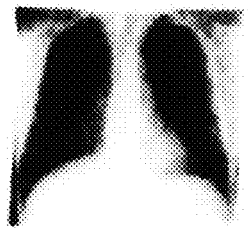
SOFT TISSUE         BONES           STANDARD
FIG. 15A        FIG. 15B        FIG. 15C
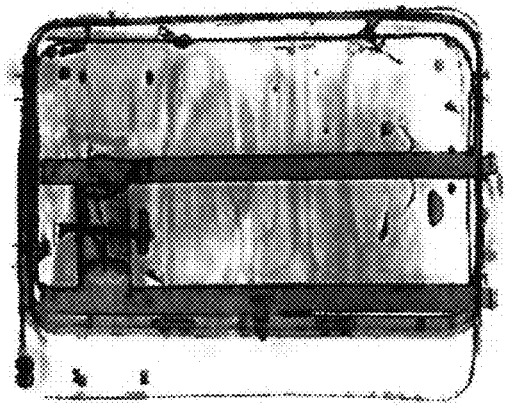 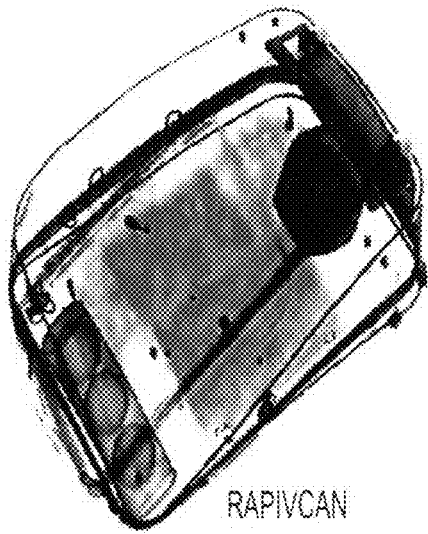
SMITH                              RAPIVCAN
FIG. 16A                    FIG. 16B

METHOD OF CREATING A DIVERGENCE TRANSFORM FOR IDENTIFYING A FEATURE OF INTEREST IN HYPERSPECTRAL DATA

REFERENCE TO RELATED APPLICATIONS

This application is a continuation of U.S. patent application Ser. No. 11/374,610 filed on Mar. 14, 2006, now abandoned, which is a continuation-in-part of U.S. patent application Ser. No. 11/136,406 filed on May 25, 2005, now U.S. Pat. No. 7,496,218, and a continuation-in-part of U.S. patent application Ser. No. 11/136,526 filed on May 25, 2005, now Pat. No. 7,492,937. U.S. patent application Ser. Nos. 11/136,406 and 11/136,526 each claim priority to Provisional Application No. 60/574,220, filed on May 26, 2004, Provisional Application No. 60/574,221, filed on May 26, 2004, Provisional Application No. 60/578,872, filed on Jun. 14, 2004 and Provisional Application No. 60/661,477, filed on Mar. 15, 2005.

BACKGROUND OF THE INVENTION

1. Field of the Invention

This invention relates to image analysis and, more specifically, to a system and method for identifying objects of interest in image data. This includes, but is not limited to a methodology for accomplishing image segmentation, clarification, visualization, feature extraction, classification, and identification.

2. Background of the Related Art

Computer-aided image recognition systems rely solely on the pixel content contained in a two-dimensional image. The image analysis relies entirely on pixel luminance or color, and/or spatial relationship of pixels to one another. In addition, image recognition systems utilize analysis methodologies that often assume that distinctive characteristics of objects exist and can be differentiated.

However, most real-world image analysis problems involve limitations in accurately segmenting/classifying the objects. The following are some of the specific issues limiting existing image analysis methodologies:

(1) input data (image objects) need to be transformed into structured data type;
(2) did not adjust for proper combination of scale, rotation, perspective, size, etc.;
(3) classes of objects need to be distinguishable using the image or its representation;
(4) Grayscale image analysis still represents a serious problem in some applications.
(5) Color processing can be very computationally intensive.

SUMMARY OF THE INVENTION

An object of the invention is to solve at least the above problems and/or disadvantages and to provide at least the advantages described hereinafter.

Therefore, an object of the present invention is to provide a system capable of detecting objects of interest in image data with a high degree of confidence and accuracy.

Another object of the present invention is to provide a system and method that does not directly rely on predetermined knowledge of an objects shape, volume, texture or density to be able to locate and identify a specific object or object type in an image.

Another object of the present invention is to provide a system and method of identifying objects of interest in image data that is effective at analyzing images in both two- and three-dimensional representational space using either pixels or voxels.

Another object of the present invention is to provide a system and method of distinguishing a class of known objects from objects of similar color and texture whether or not they have been previously explicitly observed by the system.

Another object of the present invention is to provide a system and method of identifying objects of interest in image data that works with very difficult to distinguish/classify image object types, such as: (i) apparent random data; (ii) unstructured data; and (iii) different object types in original images.

Another object of the present invention is to provide a system and method of identifying objects of interest in image data that can cause either convergence or divergence (clusterization) of explicit or implicit image object characteristics that can be useful in creating discriminating features/characteristics.

Another object of the present invention is to provide a system and method of identifying objects of interest in image data that can preserve object self-similarity during transformations.

Another object of the present invention is to provide a system and method of identifying objects of interest in image data that is stable and repeatable in its behavior.

To achieve the at least above objects, in whole or in part, there is provided a method of creating a divergence transform for identifying a feature of interest in hyperspectral data, comprising (1) selecting a point operation, (2) performing the point operation on a subset of the hyperspectral data, wherein the subset of the hyperspectral data comprises contains the feature of interest, and (3) repeating steps (1) and (2) until a resulting point operation bifurcates the feature of interest, whereby the resulting point operation corresponds to the divergence transform.

To achieve the at least above objects, in whole or in part, there is also provided a method of creating a series of divergence transforms for identifying a feature of interest in hyperspectral data, comprising (1) selecting a series of point operations, (2) performing the series of point operations sequentially on a subset of the hyperspectral data, wherein the subset of the hyperspectral data contains the feature of interest, and (3) repeating steps (1) and (2) until a resulting series of point operations bifurcates the feature of interest, whereby the resulting series of point operations correspond to the series of divergence transforms.

To achieve the at least above objects, in whole or in part, there is also provided a method of creating a divergence transform for identifying a feature of interest in hyperspectral data, comprising (1) assimilating a database of hyperspectral data, wherein at least some of the hyperspectral data contains the feature of interest, (2) selecting a point operation, (3) performing the point operation on a subset of the hyperspectral data, wherein the subset of the hyperspectral data contains the feature of interest, and (4) repeating steps (2) and (3) until a resulting point operation bifurcates the feature of interest, whereby the resulting point operation corresponds to the divergence transform.

To achieve the at least above objects, in whole or in part, there is also provided a method of creating a series of divergence transforms for identifying a feature of interest in hyperspectral data, comprising (1) assimilating a database of hyperspectral data, wherein at least some of the hyperspectral data contains the feature of interest, (2) selecting a series of point operations, (3) performing the series of point operations sequentially on a subset of the hyperspectral data, wherein the subset of the hyperspectral data contains the feature of interest, and (4) repeating steps (2) and (3) until a resulting series of point operations bifurcates the feature of interest, whereby the resulting series of point operations correspond to the series of divergence transforms.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The patent or application file contains at least one drawing executed in color. Copies of this patent or patent application publication with color drawing(s) will be provided by the Patent Office upon request and payment of the necessary fee.

The invention will be described in detail with reference to the following drawings, in which like reference numerals refer to like elements, wherein:

FIGS. 15A-15C are medical x-ray images;

FIGS. 16A and 16B are x-ray images from a Smith Detection (Smith) x-ray scanner and a Rapiscan x-ray scanner, respectively;

DETAILED DESCRIPTION OF PREFERRED EMBODIMENTS

Definition of Terms

Figure 1:
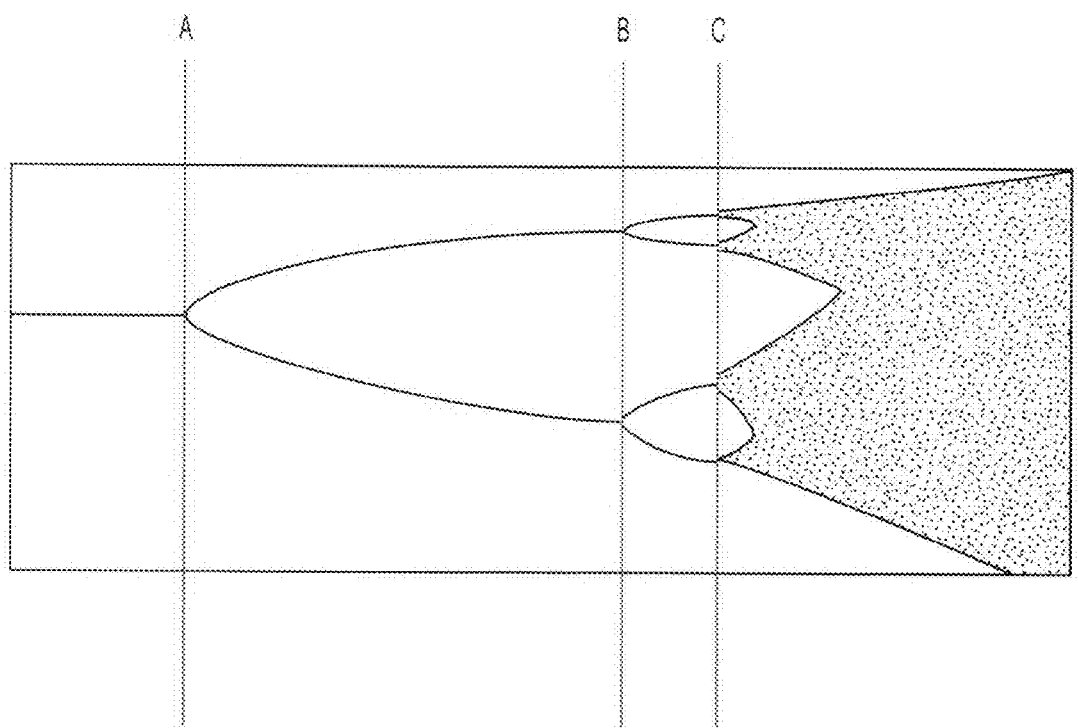
FIG. 1 is a bifurcation diagram.

The following definitions hold throughout the contents of this application. If additional or alternative definitions of the same or similar words are provided herein, those definitions should be included herein as well.

"Statistically identical" or "statistically indistinguishable": Two sets of data are referred to as "statistically identical" or "statistically indistinguishable" if under one or more types of statistics or observation there is almost no discernable difference between them.

Point operation: Point operation is a mapping of a plurality of data from one space to another space which, for example, can be a point-to-point mapping from one coordinate system to a different coordinate system. Such data can be represented, for example, by coordinates such as (x, y) and mapped to different coordinates ($\alpha$, $\beta$) values of pixels in an image.

Z effective ($Z_{eff}$): Is the effective atomic number for a mixture/compound of elements. It is an atomic number of a hypothetical uniform material of a single element with an attenuation coefficient equal to the coefficient of the mixture/compound. Z effective can be a fractional number and depends not only on the content of the mixture/compound, but also on the energy spectrum of the x-rays.

Divergence: The movement or spreading of points in vector space from within a local neighborhood (vicinity) to radically different values or locations.

"Divergence transform" or "bifurcation transform": The phrases "divergence transform" and "bifurcation transform" are used interchangeably and each results from a nonlinear or discontinuous remapping of points in vector space which when operating on data such as an entire image, image segment, or subset of an image, causes information relating to the content of the data that otherwise would not have been readily or easily apparent to become available or more easily apparent or accessible.

"Divergence transformation" or "bifurcation transformation": The phrases "divergence transformation" and "bifurcation transformation" are used interchangeably and refer to a transform which, when operating on data such as a segment or subset of an image, causes information relating to the content of the data that otherwise would not have been readily or easily apparent to become available or more easily apparent or accessible. The intent of the transform is to cause a bifurcation of the image data.

For example, when applying a divergence transformation to an image or a segment of the image, information regarding the contents of the image which would not have been easily recognized prior to application of the divergence transformation becomes more apparent or known. For example, two objects in the same image that are almost indistinguishable become distinguishable after the divergence transformation is applied.

Hyperspectral data: Hyperspectral data is data that is obtained from a plurality of sensors at a plurality of wavelengths or energies. A single pixel or hyperspectral datum can have hundreds or more values, one for each energy or wavelength. Hyperspectral data can include one pixel, a plurality of pixels, or a segment of an image of pixels, etc., with said content. As contained herein, it should be noted that hyperspectral data can be treated in a manner analogous to the manner in which data resulting from a divergence transformation is treated throughout this application for systems and methods for threat or object recognition, identification, image normalization and all other processes and systems discussed herein.

For example, a divergence transformation can be applied to hyperspectral data in order to extract information from the hyperspectral data that would not otherwise have been apparent. Divergence transformations can be applied to a plurality of pixels at a single wavelength of hyperspectral data or multiple wavelengths of one or more pixels of hyperspectral data in order to observe information that would otherwise not have been apparent.

Nodal point: A nodal point is a point in an image transformation or series of image transformations where similar pixel values exhibit a significantly distinguishable change in value. Pixels are a unitary value within a 2D or multi-dimensional space (such as a voxel).

Object: An object can be a person, place or thing.

Object of interest: An object of interest is a class or type of object such as explosives, guns, tumors, metals, knives, camouflage, etc. An object of interest can also be a region with a particular type of rocks, vegetation, etc.

Threat: A threat is a type of object of interest which typically but not necessarily could be dangerous.

Image receiver: An image receiver can include a process, a processor, software, firmware and/or hardware that receives image data.

Image mapping unit: An image mapping unit can be a processor, a process, software, firmware and/or hardware that maps image data to predetermined coordinate systems or spaces.

Comparing unit: A comparing unit can be hardware, firmware, software, a process and/or processor that can compare data to determine whether there is a difference in the data.

Color space: A color space is a space in which data can be arranged or mapped. One example is a space associated with red, green and blue (RGB). However, it can be associated with any number and types of colors or color representations in any number of dimensions.

HSI color space: A color space where data is arranged or mapped by Hue, Saturation and Intensity.

Predetermined color space: A predetermined color space is a space that is designed to represent data in a manner that is useful and that could, for example, cause information that may not have otherwise been apparent to present itself or become obtainable or more apparent.

RGB DNA: RGB DNA refers to a representation in a predetermined color space of most or all possible values of colors which can be produced from a given image source. Here, the values of colors again are not limited to visual colors but are representations of values, energies, etc., that can be produced by the image system.

Signature: A signature is a representation of an object of interest or a feature of interest in a predetermined space and a predetermined color space. This applies to both hyperspectral data and/or image data.

Template: A template is part or all of an RGB DNA and corresponds to an image source or that corresponds to a feature or object of interest for part or all of a mapping to a predetermined color space.

Algorithms: From time to time, transforms and/or divergence transformations are referred to herein as algorithms.

Algorithms and systems discussed throughout this application can be implemented using software, hardware, and firmware.

Modality: any of the various types of equipment or probes used to acquire images. Radiography, CT, ultrasound and magnetic resonance imaging are examples for modalities in this context.

The analysis capabilities of the present invention can apply to a multiplicity of input devices created from different electromagnetic and sound emanating sources such as ultraviolet, visual light, infra-red, gamma particles, alpha particles, etc.

Image Transformation Divergence System and Method—General Overview

The present invention identifies objects of interest in image data utilizing image conditioning and data analysis in a process herein termed "Image Transformation" (ITR) or, equivalently, "Image Transformation Divergence" (ITD). The terms ITR and ITD refer to the same process, and may be used interchangeably herein.

The ITD process can cause different yet almost identical objects in a single image to diverge in their measurable properties. An aspect of the present invention is the discovery that objects in images, when subjected to special transformations, will exhibit radically different responses based on the pixel values of the imaged objects. Using the system and methods of the present invention, certain objects that appear almost indistinguishable from other objects to the eye or computer recognition systems, or are otherwise identical, generate radically different and significant differences that can be measured.

Another aspect of the present invention is the discovery that objects in images can be driven to a point of non-linearity by certain transformation functions. The transformation functions can be applied singly or in a sequence, so that the behavior of the system progresses from one state through a series of changes to a point of rapid departure from stability called the "point of divergence."

FIG. 1 is an example of a bifurcation diagram illustrating iterative uses of divergence transforms, where each node represents an iteration or application of another divergence transform. A single image is represented as a simple point on the left of the diagram. There are several branches in the diagram (at lines A, B and C) as the line progresses from the original image representation on the left, indicating node points where bifurcation occurs ("points of bifurcation"). In this example, three divergence transforms were used in series at points A, B and C. In this example, each divergence transform results in a bifurcation of the image objects or data. At point A, some objects that are very dissimilar from the objects of interest diverge away from the most likely object of interest candidates (e.g., threat vs. non-threat, malignant vs. benign tumor, vegetation vs. camouflage, etc.). This is defined mathematically as reaching a "Repellor Point."

At point B, additional objects are rejected and diverge away from the remaining object of interest candidates. At point C, the search is further refined and additional objects are rejected and diverge away from the remaining object of interest candidates. This spatial filtering process is analogous to applying narrower and narrower band pass filters in the frequency domain.

At a certain number of iterations (beyond point C in this example), the object integrity may deteriorate or no further improvement in the detection process is realized. At this point, other methodologies, e.g., Machine Learning Algorithms (MLAs) may be applied to further distinguish the objects of interest from other object of interest candidates.

Another aspect of the present invention is that one can apply the "principle of divergence" to the apparent stability of fixed points or pixels in an image and, by altering one or more parameter values, give rise to a set of new, distinct and clearly divergent image objects. Because each original object captured in an image responds uniquely at its point of divergence, the methods of the present invention can be used in an image recognition system to distinguish and measure objects. It is particularly useful in separating and identifying objects that have almost identical color, density and volume.

The system and methods of the present invention provides at least the following advantages over prior image extraction methodologies:

(1) It is a system capable of detecting objects with a high degree of confidence;
(2) It does not rely only on a prior knowledge of an objects shape, volume, texture or density to be able to locate and identify a specific object or object type in the image;
(3) It is effective at analyzing images in multi-dimensional representational space using either pixels or voxels;
(4) It is most powerful where a class of known objects is to be distinguished from objects of similar color and texture, whether or not they have not been previously observed or trained by the ITD system;
(5) It works with very difficult to distinguish/classify image object types, such as different object types in original images (threats and non-threats for example or different types of threats) have almost indistinguishable differences between their features when analyzed;
(6) It can more effectively apply statistical analysis tools to distinguish data;
(7) It can cause either convergence or divergence of image object features;
(8) It can preserve object geometrical integrity during transformations; and
(9) It is stable and repeatable in its behavior.

In one exemplary embodiment of the present invention, special transformations are applied to images in an iterative "filter chain" sequence. The nature of the sequence of transforms causes objects in the image to exhibit radically different responses based on their pixel value(s) such as color (that are related to the physical properties inherent in the original objects in the image). Using the sequencing process, certain objects that appear almost indistinguishable to the eye or computer recognition systems from other objects, generate radically different and significant differences that can be easily measured.

As transform parameters are increased, the behavior of the objects progresses from one of simple stability, through a sequence of changes, to a state of a unique and radical change. The state of unique and radical change comes about due to a characteristic "signature" associated with the object of interest's interaction with the source used to create the image. These signatures are exploited by adapting the divergence transforms of the present invention.

The ITD process works with an apparently stable set of fixed points or pixels in an image and, by altering one or more parameter values, giving rise to a set of new, distinct, and clearly divergent image objects. Commonly used and understood transforms work within the domain where images maintain equilibrium.

As will be discussed in more detail below, the ITD method starts by first segmenting the image into objects of interest, then applying different filter sequences to the same original pixels in the identified objects of interest using the process. In this way, the process is not limited to a linear sequence of filter processing.

Because of the unique nature of the segmentation process using this iterative approach, objects within objects can be examined. As an example, an explosive inside of a metal container can be located by first locating all containers, remapping the original pixel data with known coordinates in the image and then examining the remapped original pixels in the identified object(s) in the image for threats with additional filter sequences.

With the ITD process, transforms can be tuned to optimize the distinction of the object of interest of the images. In addition, the process works for both image segmentation and feature generation through an iterative process of applying image transforms. As discussed above, it is defined mathematically as a reaching a Repellor Point.

Figure 2:
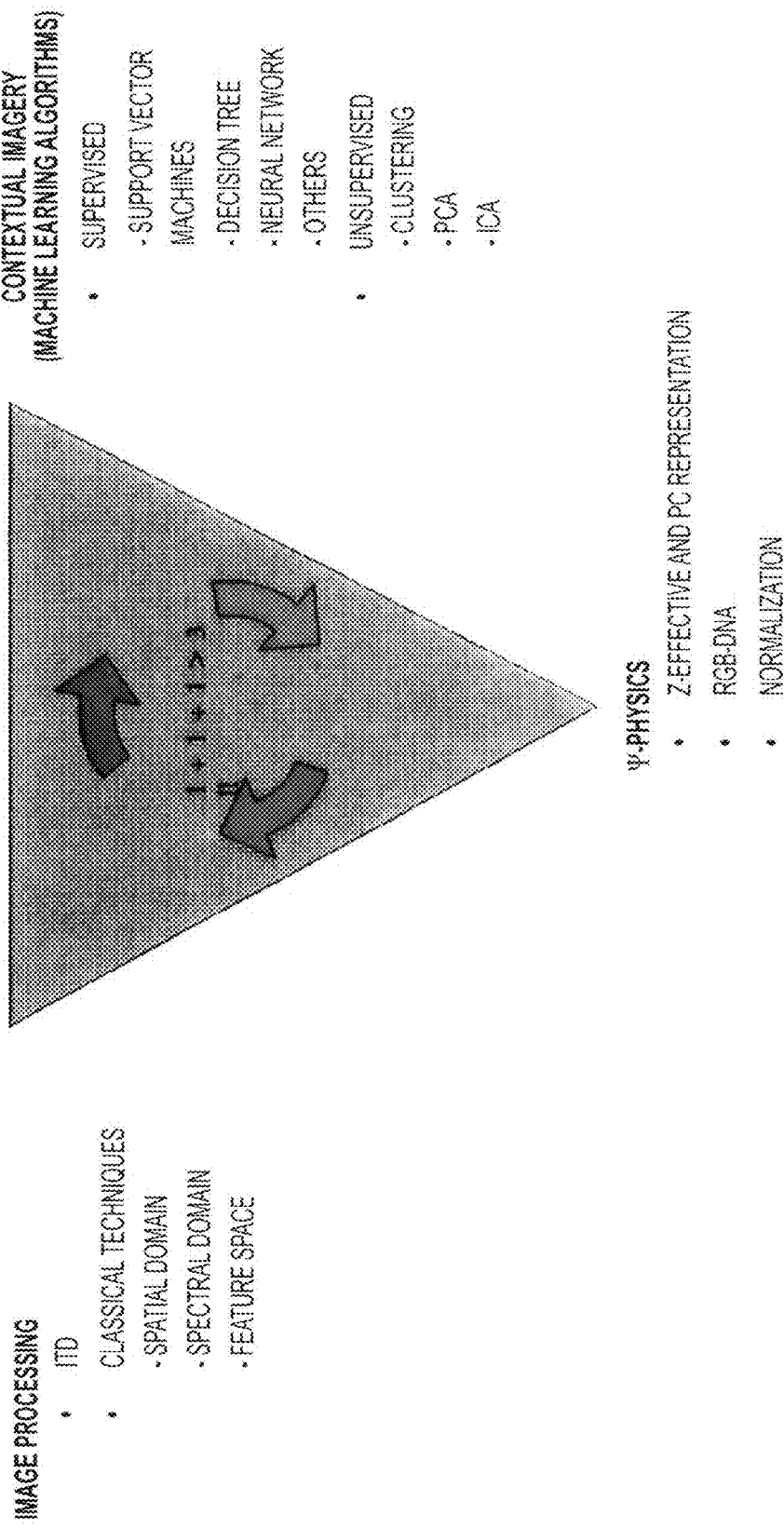
FIG. 2 is a diagram illustrating how three complementary paradigms are used to obtain intelligent image informatics, in accordance with one embodiment of the present invention.

An aspect of the present invention is the use of three complementary paradigms to extract information out of images that would otherwise not be readily available. This process is herein referred to as "Intelligent Image Informatics". As illustrated in FIG. 2, the three complementary paradigms include: (1) Image Processing; (2) Pattern Classification (Contextual Imagery with Machine Learning); and (3) ψ—Physics.

Imaging can take place in the spatial domain, spectral domain, RGB_DNA space and/or feature space. The Feature Extraction Process can use the image's describers/qualifiers/characteristics from the above mentioned domains. These feature can be analyzed by many pattern classification techniques, also called Machine Learning Algorithms such as Support Vector Machines (SVM), decision trees/graphs. ψ—Physics refers to the physics that governs the image source, such as dual energy scanning systems, the z-effective exhibited by different materials and the RGB_DNA that characterizes the image source. All of these methodologies and concepts will be explained in more detail below.

The ITD methodologies of the present invention reveal signatures in radiographic image objects that have been previously invisible to the human eye. The application of specific non-linear functions to a grey-scale or color radiographic images is the basis of ITD. Due to the Compton and photoelectric effects, objects in the image exhibit unique, invariant responses to the ITD algorithms based on their physical interactions with the electromagnetic beam. By applying a combination of complementary functions in an iterative fashion, objects of very similar grey-scale or color content in the original image significantly diverge at a point of non-linearity. This divergence causes almost statistically equivalent objects in the original image to display significant density, color and pattern differences. Different algorithms are used for distinguishing objects that exhibit different ranges of effective atomic numbers ($Z_{eff}$). The algorithms are tuned to be optimal within certain fractional ranges of resultant electromagnetic Compton/photoelectric combinations.

Both spatial and spectral analysis is utilized. The probability of achieving accurate results can be improved by utilizing multiple passes. With each run of the ITD process, a new hyperplane of image pixel data is created for each object. The combination of the original image plus the newly-created hyperplanes is mapped to form a multi-spectral hypercube. The hypercube has pixel dimensions $P_n$ where n is the total number of outputs from all iterations.

The hypercube now contains spectral bands for each object that are the result of the object's response to each ITD iteration. This is quite similar to the creation of hyperspectral data that is collected by sensors from the reflectance of objects. The hypercube data contains both spatial and spectral components that can be used for effective pattern classification rule generation.

Empirical testing has shown that objects retain their characteristic "response-based signatures" for a wide range of fractional Compton/photoelectric results, even when there is significant pixel mixing due to overlapping of other objects. This should not be completely unexpected since differences in a given object's thickness can generate the same $Z_{eff}$ with the variability being expressed as a change in density.

Exemplary Embodiments

A. General System and Method for Identifying an Object of Interest

Figure 3:
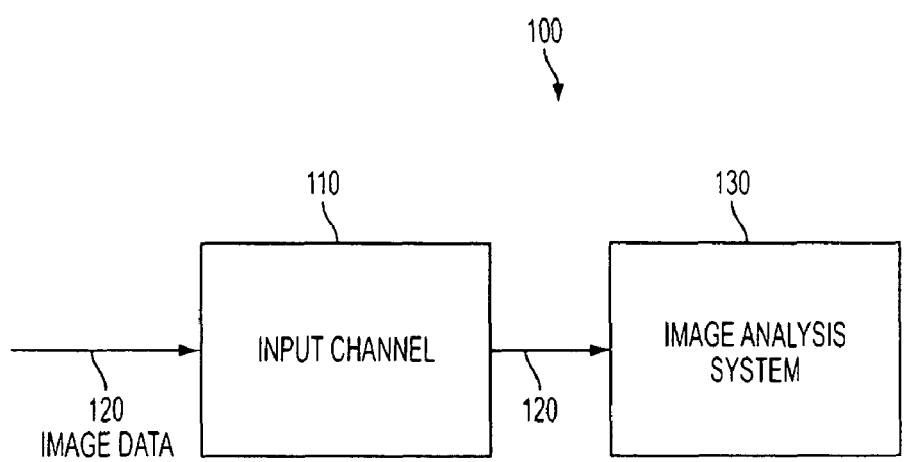
FIG. 3 is a block diagram of a system for identifying an object of interest in image data, in accordance with one embodiment of the present invention.

FIG. 3 is a block diagram of a system 100 for identifying an object of interest in image data, in accordance with one embodiment of the present invention. The system 100 comprises an input channel 110 for inputting image data 120 from an image source (not shown) and an image analysis system 130. In one preferred embodiment of the present invention, the image analysis system 130 generates transformed image data utilizing ITD, in which the object of interest is distinguishable from other objects in the image data.

The object of interest can be any type of object. For example, the object of interest can be a medical object of interest, in which case the image data can be computer tomography (CT) image data, x-ray image data, or any other type of medical image data. As another example, the object of interest can be a threat object, such as weapons, explosives, biological agents, etc., that may be hidden in luggage. In the case, the image data is typically x-ray image data from luggage screening machines.

At least one divergence transformation, preferably a point operation, is preferably utilized in the image analysis system 130. A point operation converts a single input image into a single output image. Each output pixel's value depends only on the value(s) of its corresponding pixel in the input image. Input pixel coordinates correlate to output pixel coordinates such that $X_i, Y_i \rightarrow X_o, Y_o$. A point operation does not change the spatial relationships within an image. This is quite different from local operations where the value of neighboring pixels determines the value of the output pixel.

Figure 4A:
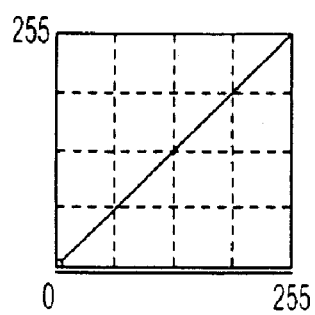
FIGS. 4A-5C are transfer functions applied to the pixel color of the image, in accordance with the present invention.

Point operations can correlate both gray levels and individual color channels in images. One example of a point operation is shown in the transfer function of FIG. 4A. In FIG. 4A, 8 bit (256 shades of gray) input levels are shown on the horizontal axis and output levels are shown on the vertical axis. If one were to apply the point operation of FIG. 4A to an input image, there would be a 1 to 1 correlation between the input and the output (transformed) image. Thus, input and output images would be the same.

Point operations are predictable in how they modify the histogram of an image. Point operations are typically used to optimize images by adjusting the contrast or brightness of an image. This process is known as contrast enhancing. They are typically used as a copying technique, except that the pixel values are modified according to the specified transfer function. Point operations are also typically used for photometric calibration, contrast enhancement, monitor display calibration, thresholding and clipping to limit the number of levels of gray in an image. The point operation is specified by the transformation function $f$ and can be defined as:

$$B(x,y) = f[A(x,y)],$$

where A is an input image and B is an output image.

The at least one divergence transformation used in the image analysis system 130 can be either linear or non-linear point operations, or both. Non-linear point operations are used for changing the brightness/contrast of a particular part of an image relative to the rest of the image. This can allow the midpoints of an image to be brightened or darkened while maintaining blacks and white in the picture.

Figure 4B:
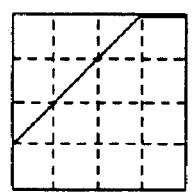
Figure 4C:
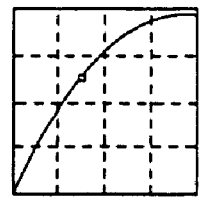
Figure 4D:
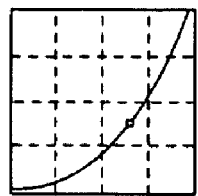
Figure 4E:
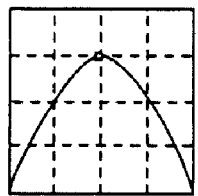
Figure 5A:
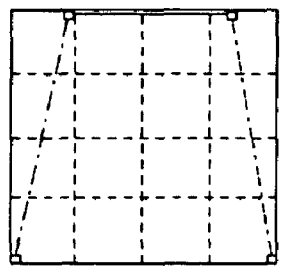

FIG. 4B is a linear transfer function, and FIGS. 4C-4E illustrate transformations of some non-linear point operations. An aspect of the present invention is the discovery that the transfer function can be used to bring an images to a point where two initially close colors become radically different after the application of the transfer function. This typically requires a radical change in the output slope of the resultant transfer function of FIG. 5A.

Figure 5B:
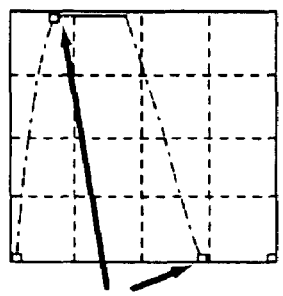

The present invention preferably utilizes radical luminance (grayscale), color channel or a combination of luminance and color channel transfer functions to achieve image object differentiation for purposes of image analysis and pattern recognition of objects. The placement of the nodal points in the transfer function(s) is one key parameter. An example of nodal point placements are shown in the transfer function example illustrated in the FIG. 5B. The nodal points in the transfer function used in the present invention are preferably placed so as to frequently create radical differences in color or luminance between image objects that otherwise are almost identical.

Figure 5C:
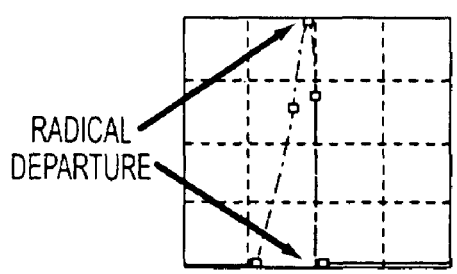
Figure 6A:
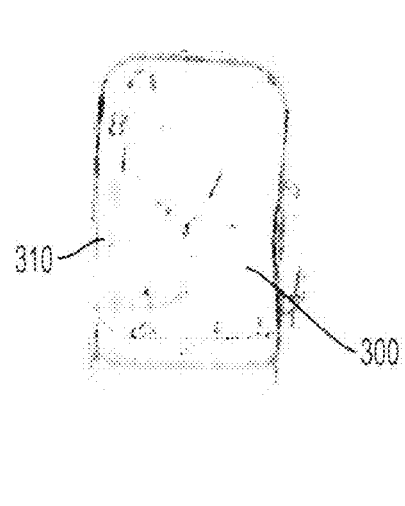
FIG. 6A is an input x-ray image of a suitcase, in accordance with the present invention.
Figure 6B:
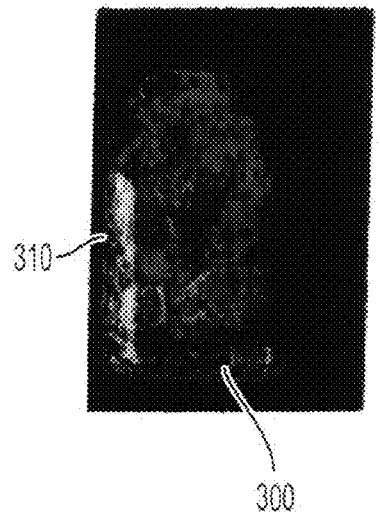
FIG. 6B is the x-ray image of FIG. 6a after application of the image transformation divergence process of the present invention.

This is illustrated in the sample transfer function of FIG. 5C. Using this transformation, two objects that are very close in color/luminance in an original image would be on opposite sides of a grayscale representation in the output (transformed) image. FIG. 6A shows an input image, and FIG. 6B shows the changes made to the input image (the transformed image obtained) as a result of applying the transfer function of FIG. 5C. The input image is an x-ray image of a suitcase taken by a luggage scanner. In this example, the objects of interest are shoes 300 and a bar of explosives 310 on the left side of the suitcase.

Note that the orange background has gone a very different color from the shoes 300 and the bar 310 on the left side of the suitcase. The transfer function of FIG. 5C uniquely delineates the objects of interest, while eliminating the background clutter in the image.

As can be seen by the input and transformed images shown in FIGS. 6A and 6B, respectively, the orange background in the image makes a radical departure from the orange objects of interest (300 and 310) and other objects that are almost identical to the objects of interest. The use of different nodal points in the transfer function will cause the objects of interest to exhibit a different color from other objects.

Data points connecting the nodes can be calculated using several established methods. A common method of mathematically calculating the data points between nodes is through the use of cubic splines.

Additional imaging processes are preferably applied in the process of object recognition to accomplish specific tasks. Convolutions such as median and dilate algorithms cause neighboring pixels to behave in similar ways under the transfer function, and may be applied to assure the objects' integrity during the transformation process.

Figure 7:
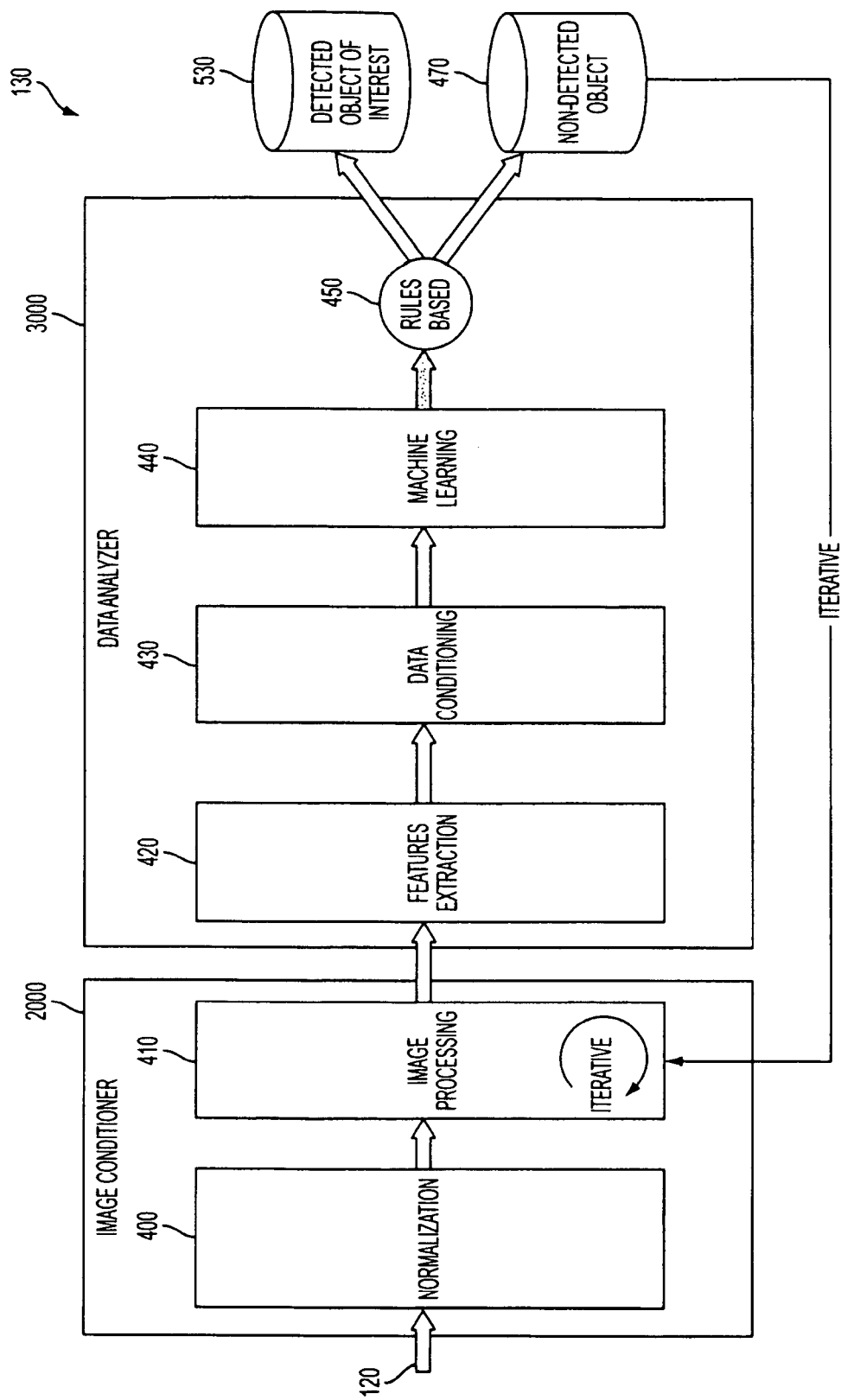
FIG. 7 is a block diagram of an image transformation divergence system and method, in accordance with one embodiment of the present invention.

FIG. 7 is a block diagram of one preferred embodiment of the image analysis system 130 of FIG. 3, along with a flowchart of a method for identifying an object of interest in image data using the image analysis system 130. The image analysis system 130 includes an image conditioner 2000 and a data analyzer 3000.

Some of the method steps will be explained with reference to the images shown in FIGS. 8A-8M, which are x-ray images of a suitcase at different stages in the image analysis process. These images are just one example of the types of images that can be analyzed with the present invention. Other types of images, e.g., medical images from X-ray machines or CT scanners, or quantized photographic images can also be analyzed with the system and methods of the present invention.

The method starts at step 400, where image may optionally be normalized. The normalization process preferably comprises the following processes: (1) referencing; (2) benchmarking; (3) conformity process; and (4) correction process.

The referencing process is used to get a reference image containing an object of interest for a given type of X-ray machine. This process consists of passing a container containing one or more objects of interest into a reference X-ray machine to get a reference image. The referencing process is preferably performed once for each X-ray machine model/type/manufacturer.

The benchmarking process is used to get a transfer function used to adjust the colors of the reference image taken by a given X-ray machine that is not the reference X-ray machine. This process consists of passing a reference container into any given X-ray machine to get the image of this reference container, which is herein referred to as the "current image." Then, the current image obtained for this X-ray machine is compared with the reference image. The difference between the current image and the reference container is made to create a transfer function.

As a transformation of the image's colors of a container, the benchmarking process determines the transfer function that maps all the colors of the current image color scheme ("current color scheme") to the corresponding colors that are present in the reference color scheme of the reference image. The transfer function applied to the current image transforms it into the reference image.

The adjustment of the colors of X-ray machines of a different type/model/manufacturer requires a distinct and specific calibration process. All X-ray machines are preferably also put through a normalization process. X-ray machines of a same type/model/manufacturer are preferably normalized using the same calibration process. All X-ray machines of different types are preferably calibrated and all the machines, no matter their type, are preferably normalized.

The conformity process is preferably used to correct the image color representation of any objects that pass through a given X-ray machine. For a given X-ray machine, the conformity process corrects the machine's image color representation (color scheme) in such a way that the color scheme of a reference image will fit the reference color scheme of the reference container.

The conformity process preferably consists of applying the transfer function to each bag that passes into an X-ray machine to "normalize" the color output of the machine. This process is specific to every X-ray machine because of the machine's specific transfer function. Each time a container passes through the X-ray machine, the conformity process is preferably applied.

The correction process is preferably used to correct the images from the X-ray machine. It preferably minimizes image distortions and artifacts. X-ray machine manufacturers use detector topologies and algorithms that could have negative effects on the image geometry and colors. Geometric distortions, artifacts and color changes made by the manufacturer have negative impacts on images that are supposed to rigorously represent the physical aspects and nature of the objects that are passed through the machine.

Unlike the conformity process that preferably compensates in a specific way the randomness of the X-ray detector sensitivities of every X-ray machine, the correction process is preferably the same for all X-ray machines of a given model/type/manufacturer.

Next, at step 410, image processing is performed on the image. Many different types of image processing techniques can be used including, but not limited to, ITD, spatial and spectral transformations, convolutions, histogram equalization and gamma adjustments, color replacement, band-pass filtering, image sharpening and blurring, region growing, hyperspectral image processing, color space conversion, etc.

In one preferred embodiment, ITD is used for the image processing step 410, and as such the image is segmented by applying a color determining transform that effect specifically those objects that match a certain color/density/effective atomic number characteristics. Objects of interest are isolated and identified by their responses to the sequence of filters. Image segmentation is preferably performed using a series of sub-steps.

Figure 8A:
FIGS. 8A-8M are x-ray images of a suitcase at different stages in the image transformation recognition process of the present invention.
Figure 8B:
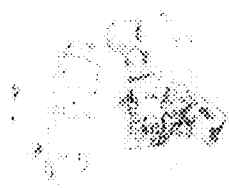
Figure 8C:
Figure 8D:
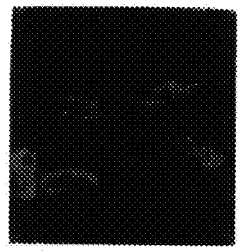
Figure 8E:
Figure 8F:
Figure 8G:
Figure 8H:
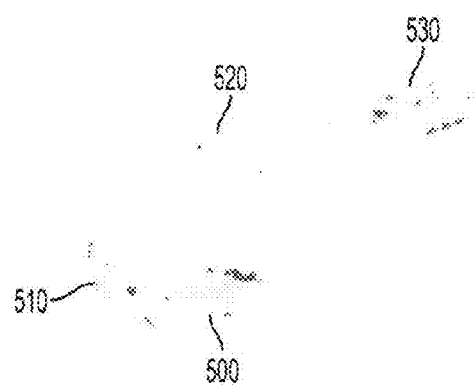

FIGS. 8B-8H show the image after each segmentation sub-step. The resulting areas of green in FIG. 8G are analyzed to see if they meet a minimum size requirement. This removes the small green pixels. The remaining objects of interest are then re-mapped to a new white background, resulting in the image of FIG. 8H. Most of the background, organic substances, and metal objects are eliminated in this step, leaving the water bottle 500, fruit 510, peanut butter 520 and object of interest 530.

At step 420, features are extracted by the data analyzer 3000 subjecting the original pixels of the areas of interest identified in step 410 to at least one feature extraction process. It is at this step that at least one divergence transformation is applied to the original pixels of the areas of interest identified in step 410.

In the image examples shown in FIGS. 8I-8M, two feature extraction processes are applied. The first process in this example uses the following formulation (in the order listed):
(1) Replace colors
(2) Maximum filter 3×3
(3) Median filter 3×3
(4) Levels and Gamma Luminance=66 black level and 255 white level and Green levels=189 black, 255 white and gamma=9.9
(5) Apply divergence transformation
(6) Maximum filter 3×3
(7) Replace black with white
(8) Median filter 3×3

Figure 8I:
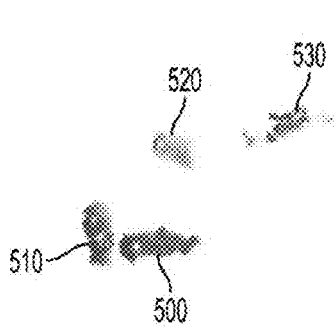
Figure 8J:
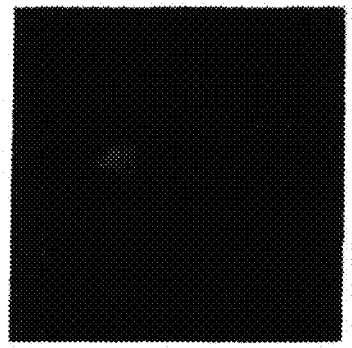
Figure 8K:
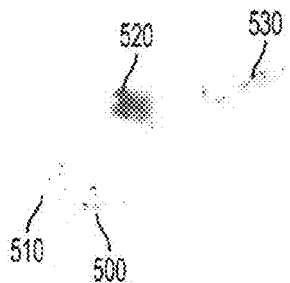
Figure 8L:
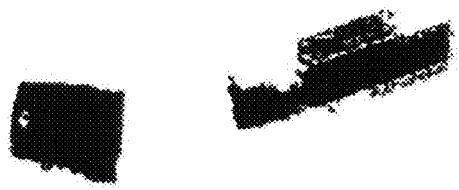

The image shown in FIG. 8I results after process step (4) above, the image shown in FIG. 8J results after process step (5) above, and the image shown in FIG. 8K results after process step (7) above. Note that most of the fruit 510 and the water bottle 500 pixels on the lower left-hand side of the image in FIG. 8K have either disappeared or gone to a white color. This is in contrast to the preservation of large portions of the peanut butter jar 520 pixels and object of interest 530 pixels, which are now remapped to a new image in preparation for the second feature extraction process (FEP).

At step 430, data conditioning is performed by the data analyzer 3000, in which the data is mathematically transformed to enhance its efficiency for the MLA to be applied at step 440. In addition, meta data is created (new metrics from the metrics created in the feature extraction step 420 such as the generation of hypercubes. This metadata can consist of any feature that is derived from the initial features generated from the spatial domain. Meta data are frequently features of the spectral domain, Fourier space, RGB_DNA, and z-effective among others.

Machine Learning Algorithms (MLAs) are capable of automatic pattern classification. Pattern classification techniques automatically determine extremely complex and reliable relationships between the image characteristics also called features. These characteristics are use by the Rules-base that exploits the relationships to automatically detect object into the images.

At step 440, machine learning algorithms (MLAs) are applied by the data analyzer 3000. The feature extraction process of step 420 is applied in order to represent the images with numbers. The MLAs applied at step 440 are responsible for generating the detection system that determines if an object of interest is present. In order to work properly, MLAs need structured data types, such as numbers and qualitative/categorical data as inputs. Since images are unstructured data types, the Feature Extraction Process is applied to transform the image or segments of an image into numbers. Each number is a metric that represents a characteristic of the image. Each image is associated with a collection of the metrics that represents it. The collection of the metrics related to an image is herein referred to as a vector. MLAs analyze the vector of the metrics for all the images and find the metrics' relationships that make up a "rules-base."

The metrics created by the feature extraction process 420 are used to reflect the image content are, but not limited to, mean, median, standard deviation, rotation cosine measures, kurtosis, Skewness of colors and, spectral histogram, co-occurance measures, gabor wavelet measures, unique color histograms, percent response, and arithmetic entropy measures.

Figure 8M:
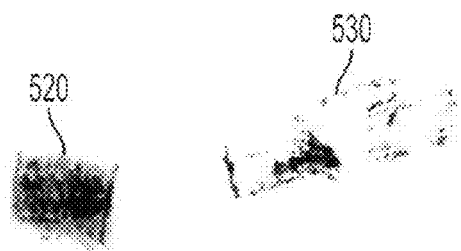
Figure 8N:
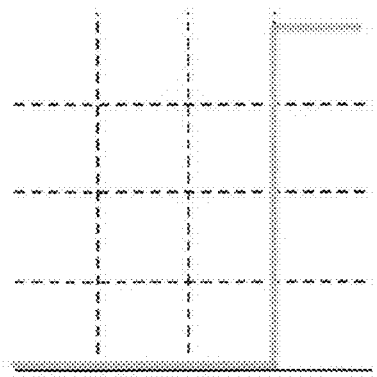
FIG. 8N is an example of a divergence transformation applied to an x-ray image during the image transformation divergence process of the present invention.

At step 450, the objects are classified by the data analyzer 3000 based upon the rules-base that classify images into objects of interest and objects not of interest according to the values of their metrics, which were extracted at step 420. As shown in FIG. 8M, the object of interest 530 is measured in this process for its orange content. The peanut butter jar 520 shows green as its primary value, and is therefore rejected.

The detected objects of interest 530 are thus distinguished from all other objects (non-detected objects 470). Steps 410-450 may be repeated as many times as desired on the non-detected objects 470 in an iterative fashion in order to improve the detection performance.

Determination of distinguishing features between objects of interest and other possible objects is done by the rule-base as a result of the analysis of the vectors of the metrics by the MLAs applied at step 440. There are hundreds of different MLAs that can be used including, but not limited to, decision trees, neural networks, support vector machines (SVMs) and Regression.

The rules-base is therefore preferably entered into code and preferably accessed from an object oriented scripting language, such as Threat Assessment Language (TAL). A sample of TAL is shown below.

```
call show_msg("C4 Process 3a")
call set_gray_threshold(255)
call set_area_threshold(400)
call color_replace_and(image_wrk,dont_care,dont_care,greater_than,0,0,45,255,255,255)
call color_replace_and(image_wrk,less_than,dont_care,less_than,128,0,15,255,255,255)
call apply_curve(image_wrk,purple_path)
call color_replace_and(image_wrk,equals,equals,equals,65,65,65,255,255,255)
call color_replace_and(image_wrk,equals,equals,equals,0,255,0,255,255,255)
```

```
call color_replace_and(image_wrk,greater_than,equals,equals,150,0,255,0,255,0)
call color_replace_and(image_wrk,equals,equals,equals,0,0,255,255,255,255)
call color_replace_and(image_wrk,dont_care,less_than,less_than,0,255,255,255,255,255)
call color_replace_and(image_wrk,dont_care,equals,dont_care,0,0,0,255,255,255)
#if (show_EOP = 1)
# call display_and_wait(image_wrk)
#endif
call pix_map = get_first_aoi(image_wrk,ALLCHAN,1,0)
if (pix_map = 0)
    jump @done_with_file
endif
call destroy_pixmap(AOI_wrk)
call AOI_wrk = copy_pixmap
call color_replace(image_tmp,greater_than,greater_than,greater_than,-1,-1,-1,255,255,255)
aoinum = 1
@C4loop3
    call show_AOI_bounding_box( )
# if (show_AOI = 1)
#   call display_and_wait(AOI_wrk)
# endif
    call AOI_masked = get_pixmap_from_bbox(scan_org,0)
    call image_tmp2 = composite_aoi(image_tmp,AOI_masked,255,255,255)
    call destroy_pixmap(image_tmp)
    call image_tmp = copy_pixmap(image_tmp2)
    call destroy_pixmap(image_tmp2)
    call destroy_pixmap(AOI_masked)
    call pix_map = get_next_aoi( )
    if (pix_map = 0)
        call destroy_aoi_list( )
        jump @C4Process3b
    endif
    call destroy_pixmap(AOI_wrk)
    call AOI_wrk = copy_pixmap
    aoinum = aoinum + 1
jump @C4loop3
```

A second pass is now made with all remaining objects in the image. The rules defined above can now eliminate objects identified in process 1. A second process that follows the logic rules will now create objects of new colors for the remaining objects of interest. The vectors of metrics of the transformed objects of interest are examined. Multiple qualitative approaches may be used in the evaluation of the objects, such as prototype performance and figure of merit. Metrics in the spatial domain, such as image amplitude (luminance, tristimulus value, spectral value) utilizing different degrees of freedom, the quantitative shape descriptions of a first-order histogram, such as standard deviation, mean, median, Skewness, Kurtosis, Energy and Entropy, % Color for red, green, and blue ratios between colors (total number of yellow pixels in the object/the total number of red pixels in the object), object symmetry, arithmetic encoder, wavelet transforms as well as other home made measurements are some, but not all, of the possible measurements that can be used. Additional metrics can be created by applying spectrally-based processes, such as Fourier, to the previously modified objects of interest or by analyzing eigenvalue produced from a Principal Components Analysis to reduce the dimension space of the vectors and remove outliers and non-representative data (metrics/images).

A color replacement technique is used to further emphasize tendencies of color changes. For example, objects that contain a value on the red channel >100, can be remapped to a level of 255 red so all bright red colors are made pure red. This is used to help identify metal objects that have varying densities.

This can now help indicate the presence of a certain metal objects regardless of its orientation in the image. It can also be correlated to geometric measurements using tools that determine boundaries and shapes. An example would be the correlation of the pixels with this red value with boundaries and centroid location. Other process may additionally be used as well.

The system and methods of the present invention are based on a methodology that is not restricted to a specific image type or imaging modality. It is capable of identifying and distinguishing a broad range of object types across a broad range of imaging applications. It works equally as well in applications such as CT scans, MRI, PET scans, mammography, cancer cell detection, geographic information systems, and remote sensing. It can identify and distinguish metal objects as well.

Figure 9:
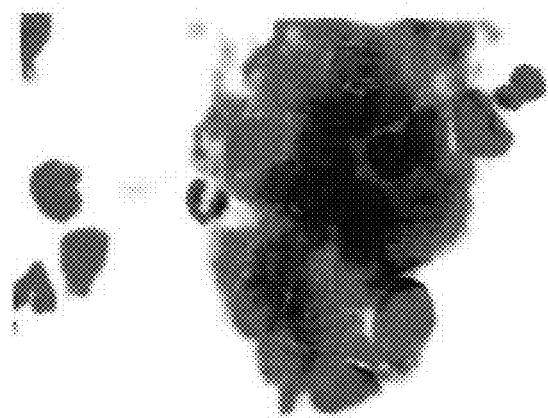
FIG. 9 is an original input medical image of normal and cancerous cells.
Figure 10:
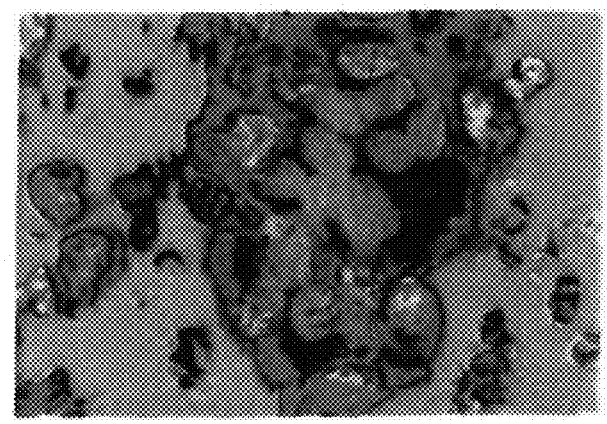
FIG. 10 is the image of FIG. 9 after application of the image transformation recognition process of the present invention.

In medicine, the present invention is capable of, for example, distinguishing cancer cell growth in blood samples and is being tested with both mammograms and x-rays of lungs. For example, FIG. 9 shows an original input image with normal and cancerous cells. FIG. 10 shows the image after the ITD process of the present invention has been applied, with only cancer cells showing up in green.

Figure 11:
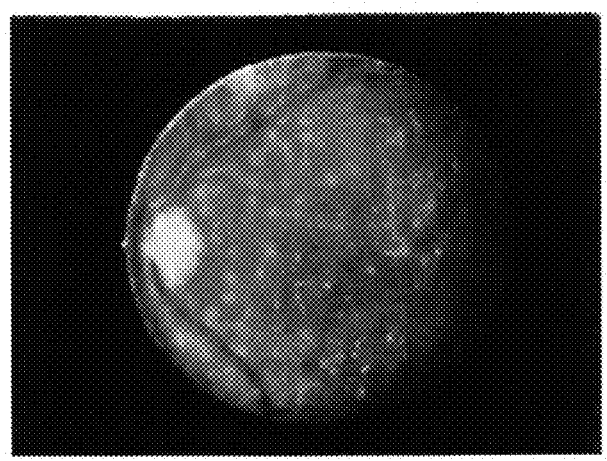
FIG. 11 is an original input ophthalmology image of a retina.
Figure 12:
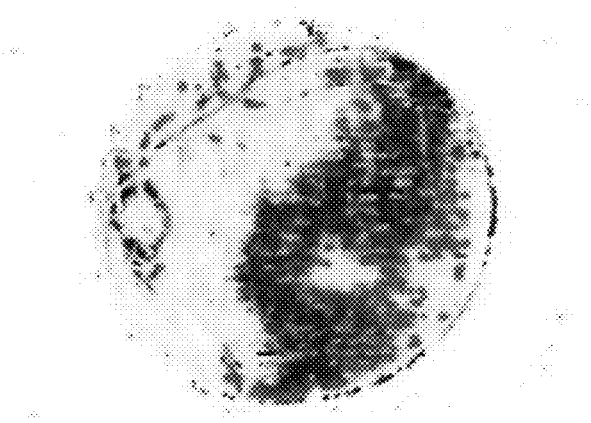
FIG. 12 is the image of FIG. 11 after application of the image transformation recognition process of the present invention.

Another example of a medical application for the present invention is shown in FIGS. 11 and 12. FIG. 11 shows an original ophthalmology image of the retina. FIG. 12 shows the image after the ITD process of the present invention have been applied, with the area of interest defined in red.

The analytical processing provided by the present invention can be extended to integrate data from a patient's familial history, blood tests, x-rays, CT, PET (Positron Emission Tomography), and MRI scans into a single integrated analysis for radiologists, oncologists and the patient's personal physician. It can also assist drug companies in reducing costs by minimizing testing time for new drug certification.

B. Machine Learning Algorithms (MLA) used for Image Classification

As discussed above, MLAs are responsible for generating the detection system that determines if an object of interest is present. Using Machine Learning Algorithms for image classification is herein referred to as "contextual imagery." Contextual imagery not only focuses on the segmented imaged, but on the entire image as well. Context often carries relevant and discriminative information that could determine if an object of interest is present or not in the scene.

MLAs analyze the vectors of metrics taken from the images. The choice of metrics is important. Therefore, the feature extraction process preferably includes "data conditioning" to statistically improve the dataset analyzed by the MLA.

Image conditioning is preferably carried out as part of the data conditioning. Image conditioning is one of the first steps performed by the image processing function. It initially consists of the removal of obvious or almost obvious objects that are not one of the objects of interest from the image. By applying image processing functions to the image, some important observations can also be made. For example, some unobvious portions of the object of interest may be distinguished from other elements that are not part of the object of interest upon the application of certain types of image processing. These aspects of image conditioning leverage the MLA's detection capability Image normalization is preferably the first process applied to the image. This consists of the removal of certain image characteristics, such as the artificial image enhancement (artifacts) that is sometimes applied the system that created the image. Image normalization could also include removing image distortions created by the acquisition system, as well as removal of intentional and unintentional artifacts created by the software that constructed the image.

There are thousands of Machine Learning Algorithms including, but not limited to, Kernel Systems such as the Support Vector Machines (SVMs) that are preferably used as one of the classification instruments. The SVM approach exhibits the following advantages:

1. It can be used with data that has a complicated structure for which a simple separating hyperplane is not sufficient for classification purposes. A nonlinear separating surface between the classes can be drawn with the SVM technique.
2. The separating surface is drawn by the SVM technique in an optimal way, maximizing the margin between the classes. In general, this provides a high probability that, with proper implementation, no other separating surface will provide better generalization performance within this framework.
3. Even when the amount of available data is small, the generalization performance is impressive.
4. The SVM technique is robust to small perturbations and noise in data.
5. A positive synergetic effect is often possible. This means that adding image data collected from new objects of interest (e.g., new types of explosives) frequently results in a more efficient recognition of images of objects of interest already included in the model.

In the case of a data set in which different classes are not linearly separated in the feature space, it is necessary to design a nonlinear separating rule between them. However, this rule can be developed in an infinite number of ways. For example, using a method of potential functions, it is possible to reach 100% of the class separation for the training data set. At the same time, the respective model would typically have a very poor generalization performance on the unseen data. This effect is commonly called 'overfitting'. Thus, the goal is to avoid over-fitting while using the nonlinear approach.

To address this issue, the SVM technique relies on the following stages:
(1) mapping the initial feature vectors to a new feature space using a nonlinear transformation; and
(2) applying a linear separating rule (a hyperplane) to vectors in the new feature space.

The use of these two stages allows one to draw the nonlinear separating surface in the original feature space. The linear character of the separating rule means, in general, better robustness and the possibility of maximizing the margin between the classes explicitly.

An improved immunity to both noise and presence of possible outliers is provided by introducing a "soft" margin. When a soft margin is used, a predetermined portion of training vectors are allowed to be misclassified. Negative consequences of the over-fitting effect can be significantly diminished or even completely averted by sacrificing this small portion of typically non-representative vectors. As a result, a much better overall generalizing performance and robustness can be achieved in practical applications.

Figure 13:
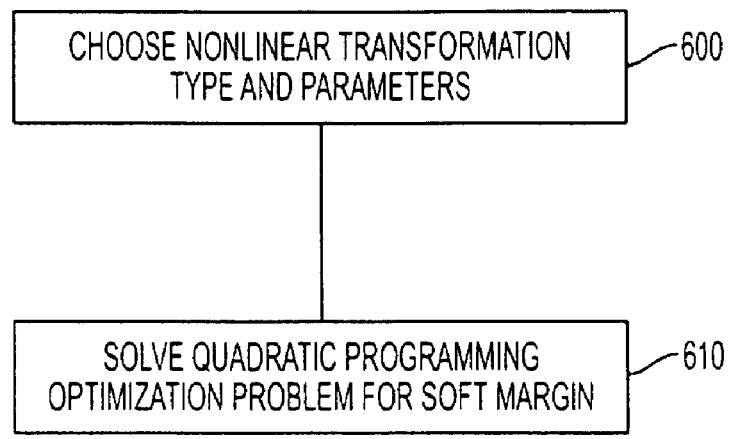
FIG. 13 is a flowchart of a method of creating a Support Vector Machine model, in accordance with one embodiment of the present invention.

FIG. 13 is a flowchart of a method of creating an SVM model, in accordance with one embodiment of the present invention. The method starts at step 600, where a nonlinear transformation type and its parameters are chosen. The transformation is performed by the use of specific "kernels", which are mathematical functions. Sigmoid, Gaussian or Polynomial kernels are preferably used.

Then, at step 610, a quadratic programming optimization problem for the soft margin is solved efficiently. This requires a proper choice of the optimization procedure parameters as well.

During the quadratic programming optimization procedure, some of the most representative vectors are selected from the pool of all vectors available for training. These vectors are herein referred to as "Support Vectors." The respective weights of the Support Vectors and a free term (a constant) are also calculated. This completes the SVM model.

Figure 14:
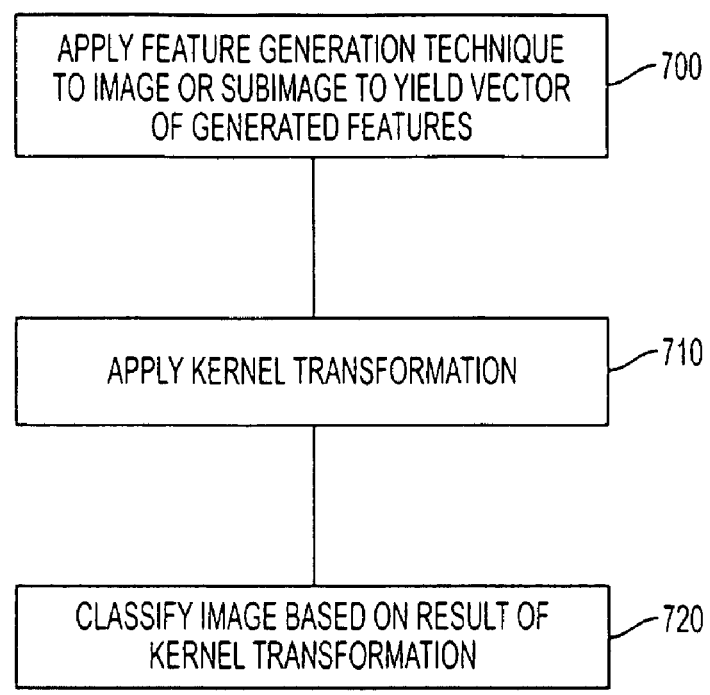
FIG. 14 is a flowchart of a method of performing a Support Vector Machine operation, in accordance with one embodiment of the present invention.

FIG. 14 is a flowchart of a method of performing an SVM operation, in accordance with one embodiment of the present invention. When a previously unseen image is classified (any sub-image can also be used instead of the image), a feature generation technique is applied at step 700 to yield a vector of the generated features that is used for the analysis.

At step 710, a specified kernel transformation is applied to each of all possible couples of the analyzed vector and a Support Vector. The received values are weighted according to the respective weight coefficients and added all together with the free term.

At step 720, the result of the kernel transformation is used to classify the image. In a preferred embodiment, the image is classified as falling in a first class (e.g., a threat) if the final result is larger than or equal to zero, and is otherwise classified as belonging to a second class (e.g., non-threat).

Although this framework was described in connection with two possible classes, it can be applied to multi-class classification problems with appropriate modification of the framework.

C. RGB-DNA Image Analysis

As discussed above, RGB-DNA is one of the image processing techniques that can be used in normalization step 400 and the image processing step 410 (FIG. 7). The phrase "RGB-DNA", as used herein, refers to a representation, in a predetermined color space, of most or all possible values of colors which can be produced from a given image source. The phrase "values of colors" is not limited to visual colors, but refers to representations of values, energies, etc. that can be produced by the imaging system. The use of RGB DNA for image analysis will be described in detail in this section.

Physics of X-Ray Scanners and Color Images

Since the discovery of x-ray radiation in 1895 by W. C. Roentgen, the output of x-ray diagnostics equipment has been associated with gray-scaled images. Initially the photographic films were used to visualize x-ray attenuation as a negative image. This technique is still used today.

Later, fluorescent screens were employed to visualize the positive image. The digital imaging of detector-to-pixel design brought the possibility of color highlighting based on one-to-one mapping of a predefined color palette into an original grayscale. In this case, the color image reflected x-ray attenuation in a more vivid way, as the grayscale image did.

The invention of energy-selective or dual energy reconstruction, initially in medical x-ray diagnostics, made distinguishing Compton and photoelectric fractions of attenuation with acceptable accuracy possible. As a result, the effective atomic number of materials $Z_{eff}$ could be computationally reconstructed, in addition to the direct measurement of attenuation alone, giving a clue about the chemical structure of the samples.

As shown in FIGS. 15A-15C, the images in medical diagnostics are usually visualized on gray-scaled screens, as images of a doctor's choice—conventional/standard (FIG. 15C), soft issues only (FIG. 15A), or bones only (FIG. 15B).

When vendors of baggage x-ray scanners adopted the dual energy technique, they replaced the black and white monitors by the color ones. It was done to simplify the work of the screeners. Instead of analyzing a sequence of gray scaled images switching from conventional to low energy, high energy, Compton fraction, photoelectric fraction and back, a single color image was delivered. The colors of the image were assigned to differentiate the chemical structure of materials according to their effective atomic numbers Z and integral density d along the x-ray beam.

According to the recommendations of the United States Transportation Security Administration (TSA), shades of blue represent metal materials, shades of orange are assigned to organic compounds, and green looking colors are responsible for so called mixed or inorganic materials. FIGS. 16A and 16B are x-ray images from a Smith Detection (Smith) x-ray scanner and a Rapiscan x-ray scanner, respectively. These are the two most commonly used baggage x-ray scanners. The principal components of any x-ray scanner are:

x-ray source with collimator;
a array of detectors;
moving belt;
digital image formation and processing software; and
computing and visualization hardware.

Figure 17:
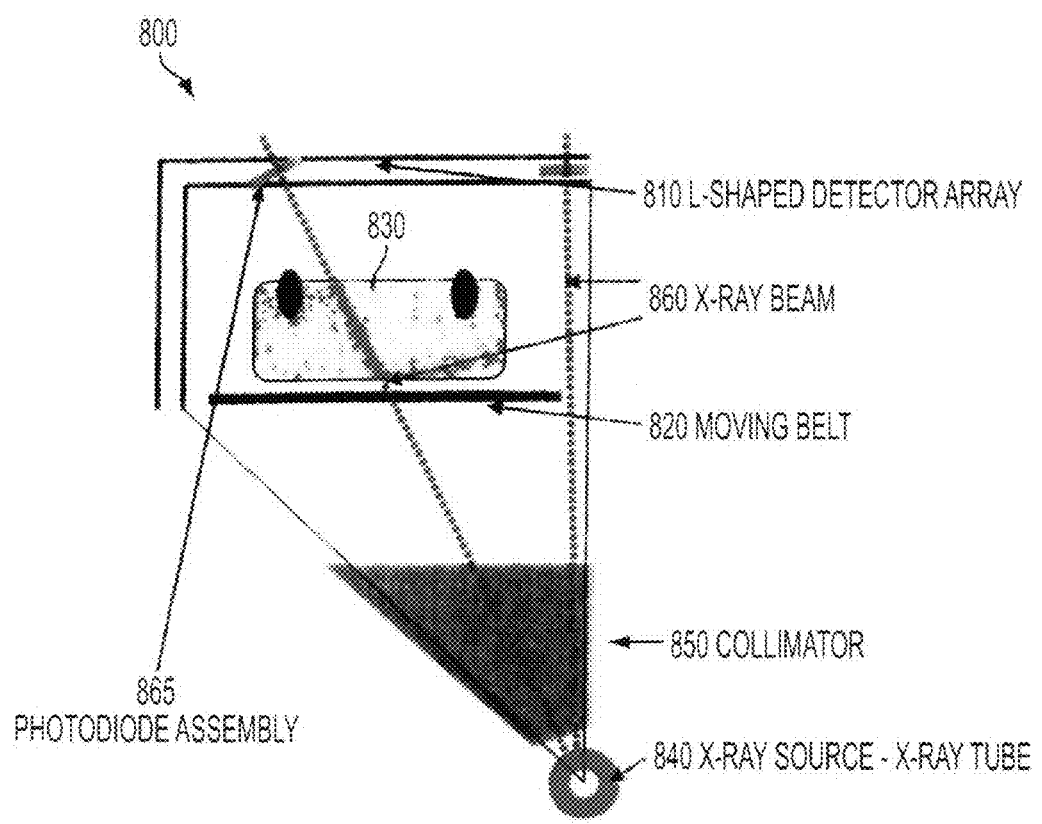
FIG. 17 is a schematic diagram of an x-ray scanner.

FIG. 17 is a schematic diagram of a typical x-ray scanner. The scanner includes an L-shaped detector array 810, a moving belt 820 for moving the item being scanned 830 through the scanner 800, an X-ray source 840, a collimator 850 for collimating an X-ray beam 860 from the X-ray source 840, and a photodiode assembly 865.

Figure 18:
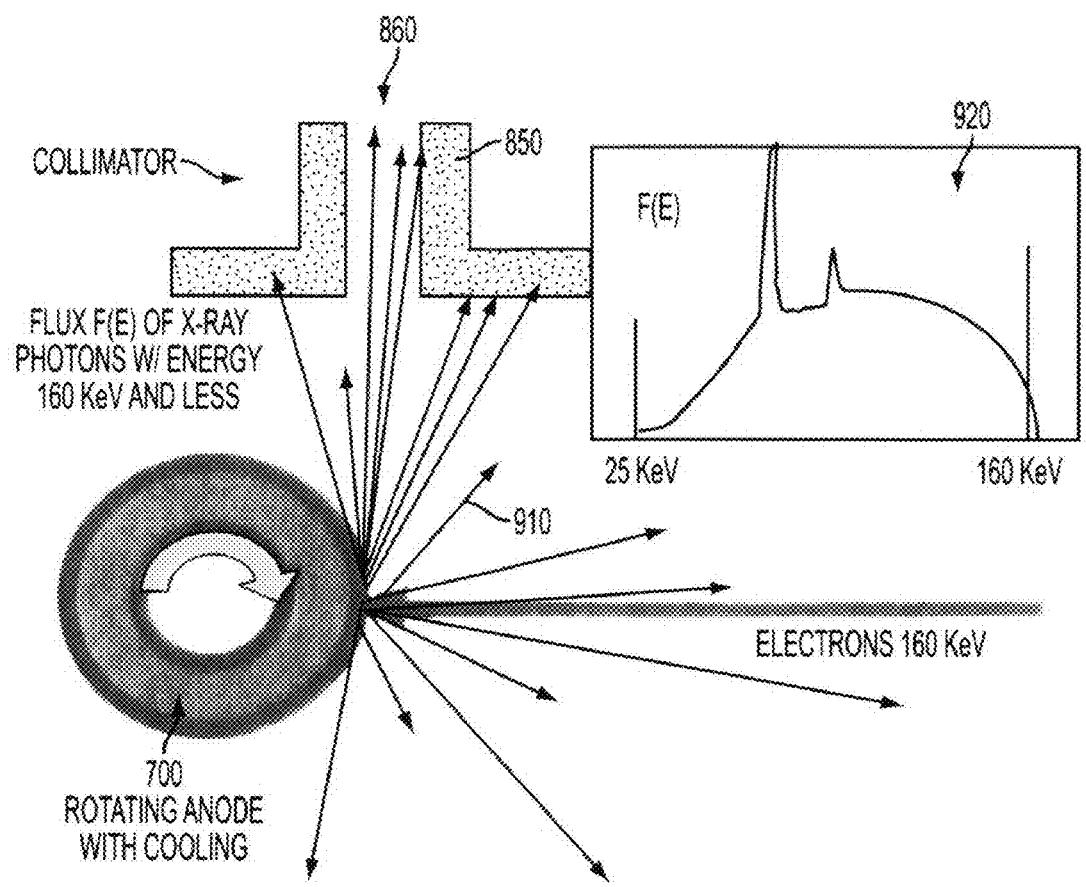
FIG. 18 is a schematic diagram of an x-ray source used in the x-ray scanner of FIG. 17.

As shown in FIG. 18, the X-ray source 840 is typically implemented with an X-ray tubes that has a rotating anode 900, which is used for generating an uninterrupted flow of X-ray photons 910. The spectrum 920 of the x-ray radiation is polychromatic, with a couple of peaks of characteristic lines. For the baggage scanners of interest, the spectrum covers a range from approximately 160 KeV to approximately 25 KeV.

The X-ray photons 910 of the beam 860 penetrate the materials in the item being scanned 830, thereby experiencing attenuation of different natures (scattering, absorption etc.). Then, the x-ray beam 860 goes into the L-shaped detector array 810 to be measured. The array 810 is typically a set of pre-assembled groups of detectors (16, 32 or 64 detectors) positioned perpendicular to the x-ray beams 860.

Each individual detector is responsible for one row of pixels on the x-ray image. For energy-selective reconstruction, two detectors per pixel row are used, i.e., the high-energy detector is placed on the top of the low energy one. They are typically separated by a copper filter (typically <0.5 mm thick) installed for energy discrimination. This filter is a crucial element of this technique. This paves a path for calculating the $Z_{eff}$ (effective atomic number) and d (integral density of the material) of the scanned object 830.

The moving belt 820 in the scanner 800 works as a slicing mechanism. One slice is one column of pixels. The speed of the belt should be synchronized with timing of the system to avoid distortion in lengthwise dimensions of the images.

Figures 19A, 19B:
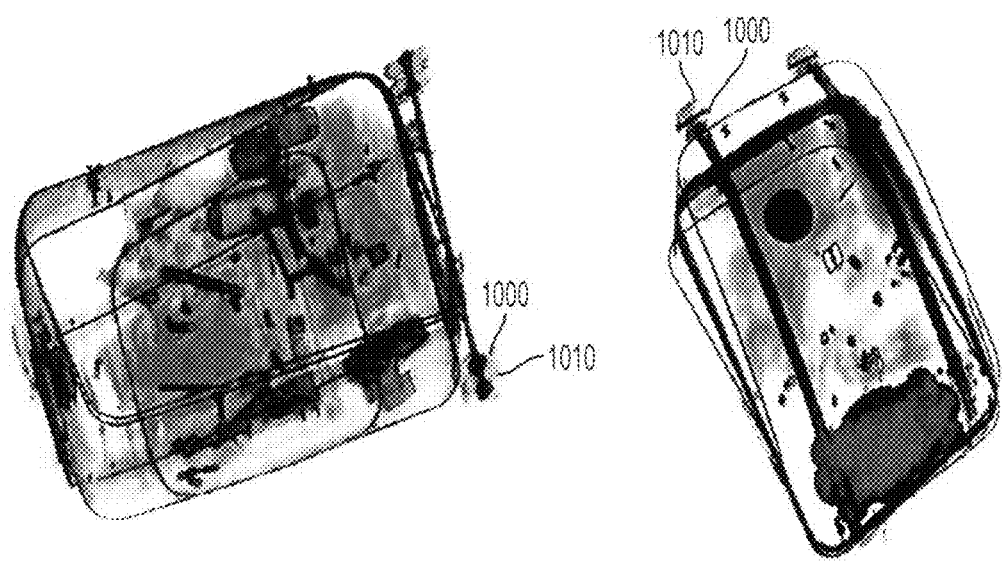
FIGS. 19A and 19B are X-ray images from a Smith scanner and a Rapiscan scanner, respectively, which illustrate geometric distortions with colors.

An L-shaped detector array 810 causes clearly visible geometric distortions in shapes. These distortions are the results of the projection-detection scheme of a particular scanner design, which can be understood by simple geometrical constructions. FIGS. 19A and 19B are X-ray images from a Smith scanner and a Rapiscan scanner, respectively, which illustrate geometric distortions with colors. The distortions are particularly apparent in the shapes of the frames 1000 and wheels 1010.

Another concern is the color representation of the dual energy image itself. X-ray scanners of different vendors, with identical dimensions and components, can deliver identical geometric appearance of shapes, but quite different colors for chemically identical scanned objects. These colors depend on the vendor's proprietary color scheme.

Nevertheless, as it will be described in more detail below, the RGB 3D color schemes of different vendors can be mapped into a single universal 2D ($Z_{eff}$, d) space of physical parameters of $Z_{eff}$ and d. The possibility of such mapping can be shown by looking at a mathematical description of the dual energy technique, and by looking at the depth of proprietary color schemes of two well known scanner vendors—Smith Detection and Rapiscan.

Mathematics of Dual Energy Technique without Colors

Figure 20:
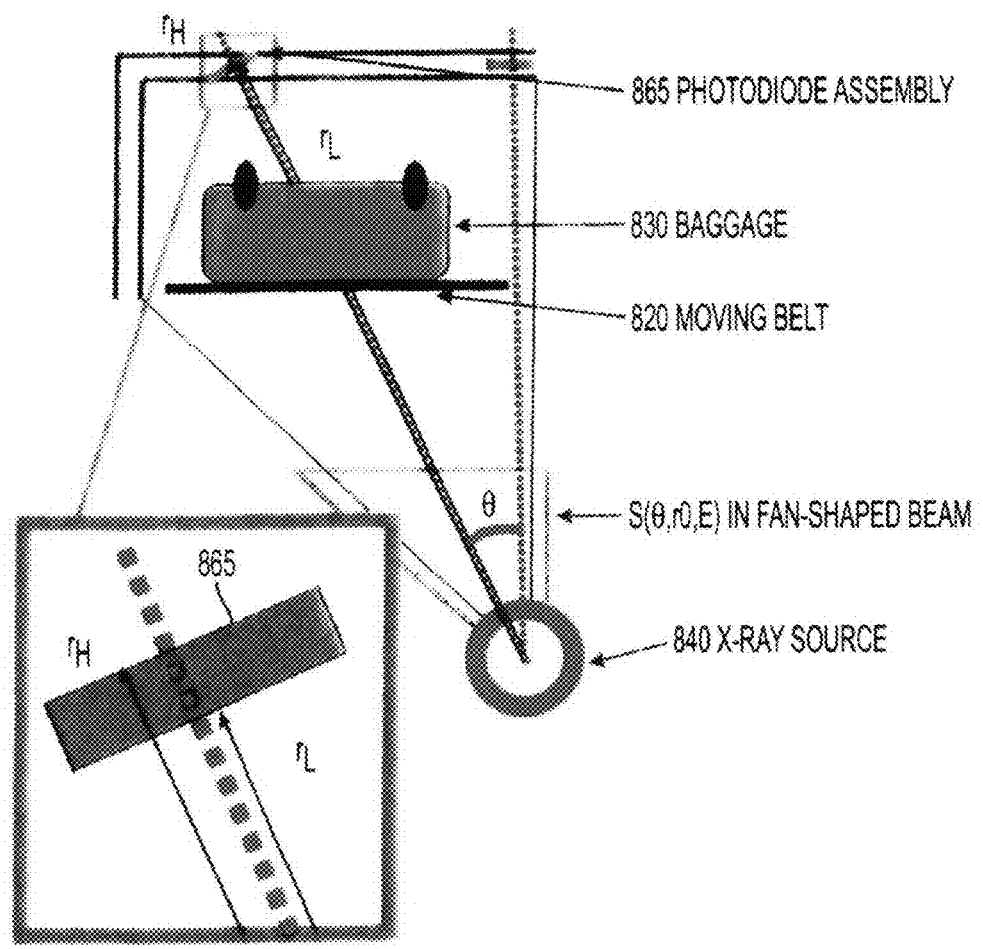
FIG. 20 is a schematic diagram of an x-ray scanner.

The two integral equations (1) and (2) below describe the flux of X-ray photons $F_L(\theta)$ and $F_H(\theta)$ measured by low energy and high energy detectors, respectively, for the geometry shown in FIG. 20.

$$\int_{E_{min}}^{E_{max}} \frac{r_0^2}{r_L^2(\theta)} \cdot S(\theta, r_0, E) \cdot \exp\left[-\frac{P}{E^3} - f_{KN}(E) \cdot C\right] dE = F_L(\theta) \quad (1)$$

$$\int_{E_{min}}^{E_{max}} \frac{r_0^2}{r_H^2(\theta)} \cdot S(\theta, r_0, E) \cdot \exp\left[-\frac{P}{E^3} - f_{KN}(E) \cdot C\right] \cdot Q(\theta, E) \, dE = \quad (2)$$

$$F_H(\theta)$$

where function $$P(\theta) = \int_{r_0}^{r_L(\theta)} k_p \frac{\rho(r,\theta)}{A(r,\theta)} Z^n(r,\theta) \cdot dr \quad (3)$$

is a photoelectric term or fraction of attenuation, and function $$C(\theta) = \int_{r_0}^{r_L(\theta)} k_c \frac{\rho(r,\theta)}{A(r,\theta)} Z(r,\theta) \cdot dr \quad (4)$$

is the Compton term of attenuation considered for every fixed value of polar angle $\theta$. $P(\theta)$ and $C(\theta)$ are the desired solution we are looking for. The function of the energy selective (copper) filter is defined as $$Q(\theta, E) = \exp\left[-\int_{r_L(\theta)}^{r_H(\theta)} \mu_f(\theta, r, E) \cdot dr\right] \quad (5)$$

The other symbols and definitions used in Equations (1) and (2) are as follows:
   $S(\theta, r_0, E)$—the input flux of x-ray photons of energy E at the surface with radius $r_0$;
   $r_0$—the distance from the x-ray generator spot to the surface where S is known;
   $R_L$—the distance to the low energy detector;
   $r_H$—the distance to the high energy detectors ($r_H$-$r_L$ is the thickness of the filter);
   $\theta$—polar angle
   $Z=Z_{eff}$—the effective atomic number
   $f_{KN}(E)$—Klein-Nishina function of Compton attenuation energy dependence;
   $\rho$—physical mass density;
   A—atomic weight;
   $\rho/A$—density of atoms;
   $k_p$ and $k_r$ are the constants dependent on the system of units of measurements; and
   n—empiric parameter (n=4 for our case).

For any given angle $\theta$, the unknown variables are P, which is responsible for photoelectric, and C, which stands for Compton attenuation. This nonlinear system can be solved when Jacobian $$J = \det\begin{pmatrix} \partial F_L/\partial P & \partial F_L/\partial C \\ \partial F_H/\partial P & \partial F_H/\partial C \end{pmatrix} \neq 0 \quad (6)$$

If P and C are found for a particular case of a uniform layer of thickness L with $\rho$=cont, Z=const, A=const, it means that:

$$P(x,y) = k_p \frac{\rho}{A} Z^n \cdot L = k_p d \cdot Z^n \quad (7)$$

$$C(x,y) = k_c \frac{\rho}{A} Z \cdot L = k_c d \cdot Z \quad (8)$$

where $$d = \frac{\rho}{A} \cdot L \quad (9)$$

is the integral density, and ratio $$\frac{P}{C} = \frac{k_p}{k_c} Z^{n-1} \quad (10)$$

does not depend on d. Therefore, $$Z = \left(\frac{P}{C} \frac{k_c}{k_p}\right)^{1/(n-1)} \quad (11)$$

$$d = P/(k_p \cdot Z^n) = C/(k_c \cdot Z) = C \bigg/ \left[k_c \cdot \left(\frac{P}{C} \frac{k_c}{k_p}\right)^{1/(n-1)}\right] \quad (12)$$

Figure 21:
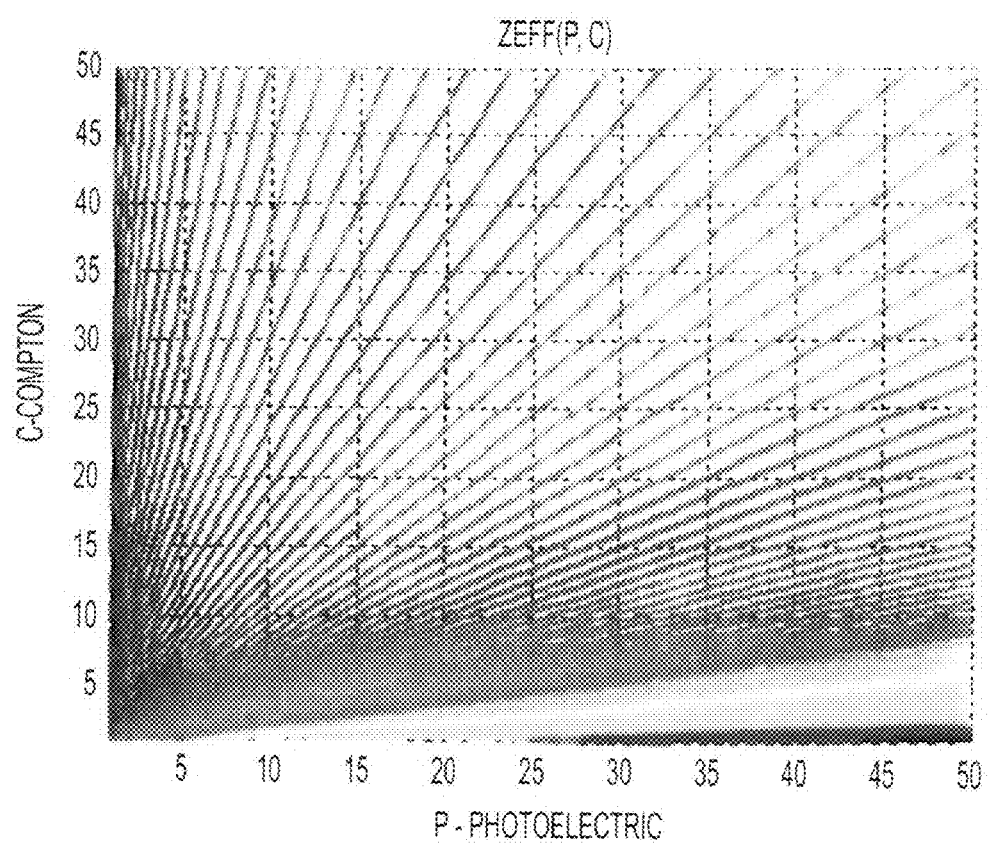
FIG. 21 is a plot of (P,C) space with Zeff (P,C)=const.

It can be seen that Z=const if the ratio P/C=const. In the (P,C) space, Z=const forms a straight line which goes from the point of origin, and the tangent of the angle between the line and P axes is equals to C/P. The plot shown in FIG. 21 shows the lines in conditional units.

Figure 22:
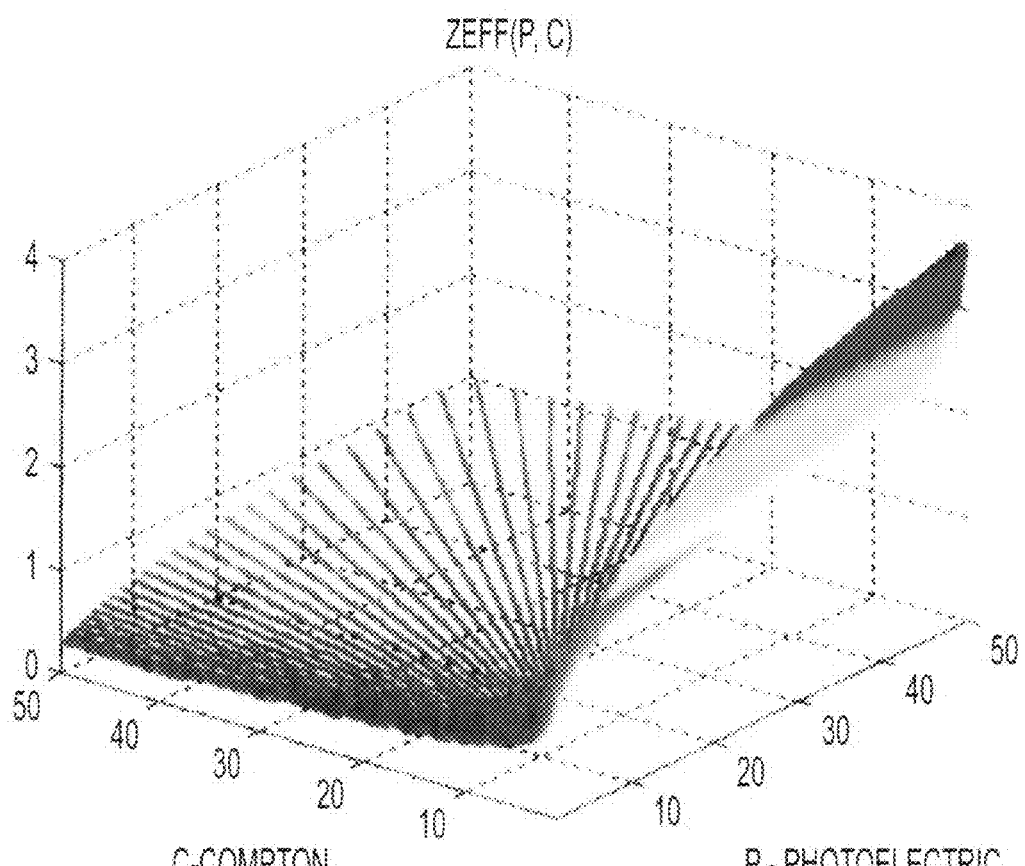
FIG. 22 is a plot showing a 3D view of (P,C) space with Zeff (P,C)=const.
Figure 23A:
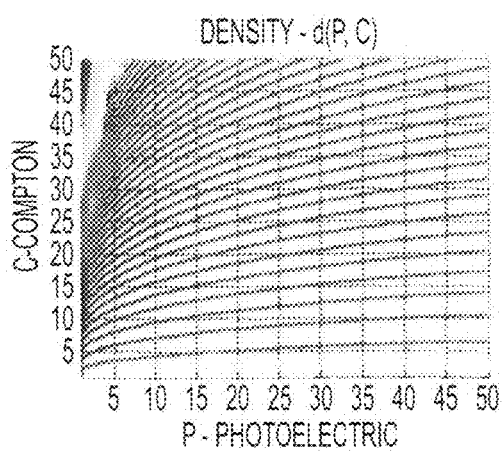
FIGS. 23A and 23B are plots showing 2D and 3D view of (P,C) space with d(P,C)=const.
Figure 23B:
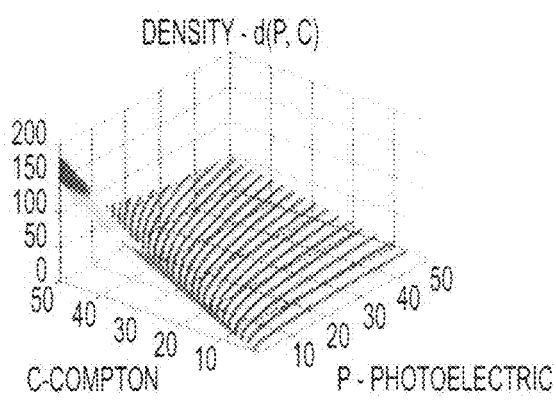

The surface Z=Z(P,C) is two-dimensional manifold in three-dimensional (P,C,Z) space, as shown in the plot of FIG. 22. The surface d=d(P,C) is a two-dimensional manifold in (P,C,d) as well, a shown in the plots of FIGS. 23A and 23B, which are plots of 2D and 3D views, respectively, of (P,C) space with Zeff (P,C)=const.

The result derived above shows the straight and simple interpretation of the lines and points in the (P,C) space. Each point with coordinates P and C in the space can be computed from the equations (1) and (2) if the right parts are measured correctly and Jacobian is nonzero. Each of the points reflects the effective atomic number Z and integral density d of an object responsible for the measured right parts of the system.

Colors in Dual Energy Scanners without Mathematics

Any color image we see on the computer screen of a dual energy scanner is a 2D array of pixels with colors represented by (R,G,B) triplets. Each of these three values (R,G,B) belongs to the interval [0,255], and the (R,G,B) set of all possible colors composes the 3D RGB space or cube of $256^3$=16777216 discrete points. One can thus assume that the number of unique colors needed to maintain an acceptable visual quality of a dual energy color image can be quite large and approaches at least the number of colors of a medium class digital camera ~1500000. Nevertheless, it was discovered that the number of unique colors in an average baggage color image is approximately 7,000 colors for a Smith HiScan 6040i scanner and less than 100,000 for a Rapiscan 515 scanner.

Figure 24A:
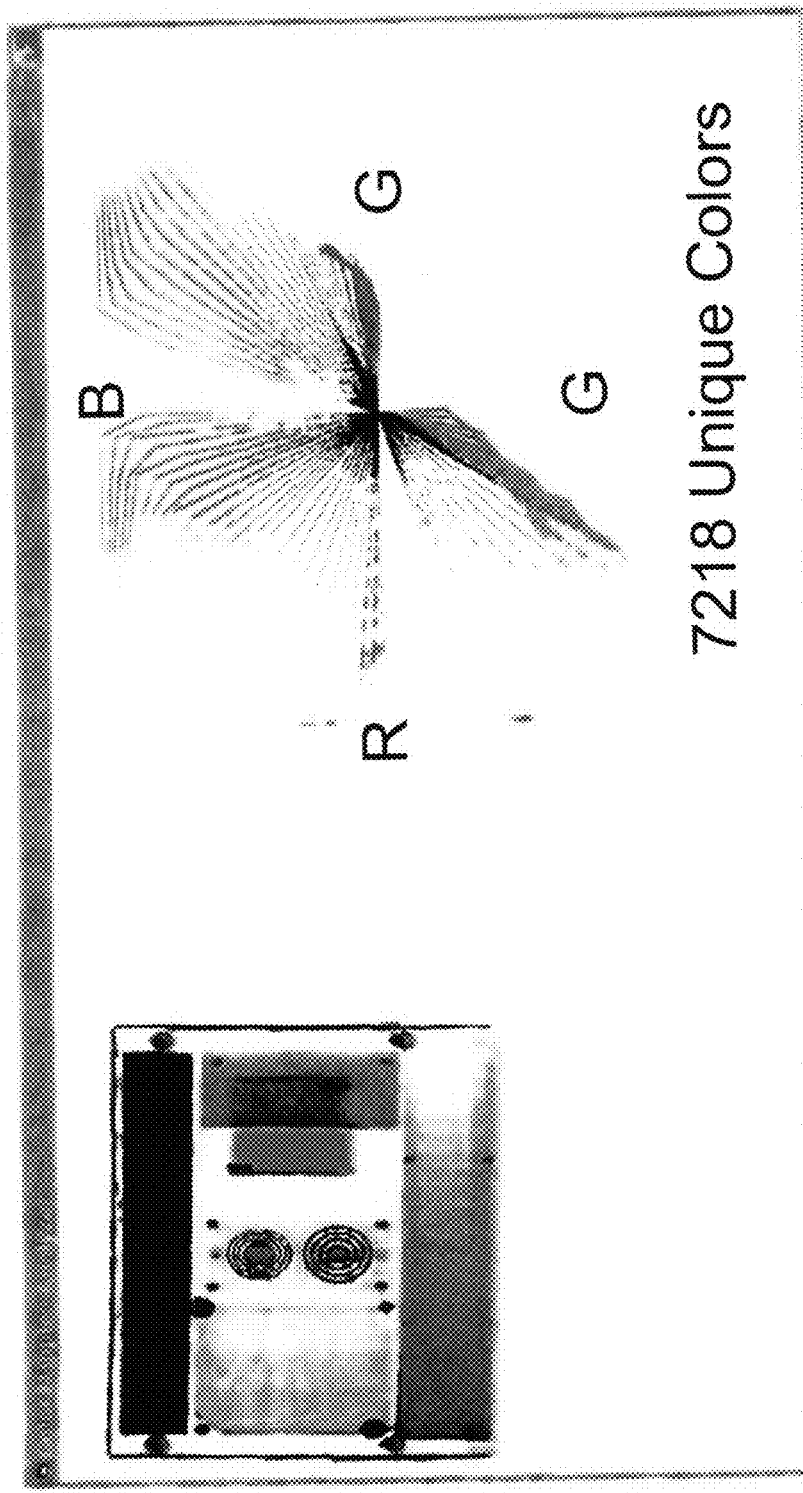
FIG. 24A is a plot showing an RGB_DNA 3×2D view for a Smith HiScan 6040i scanner.
Figure 24B:
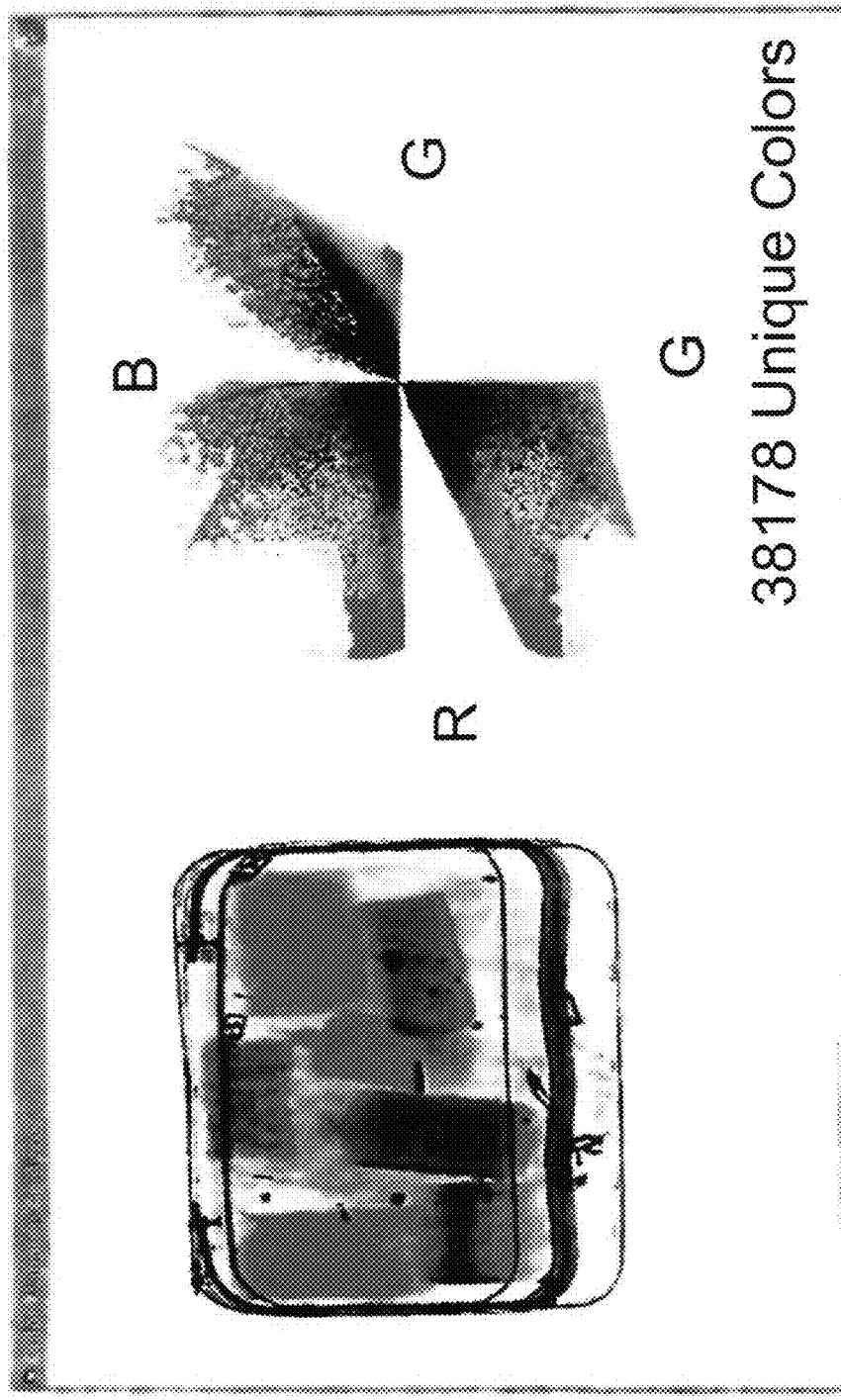
FIG. 24B is a plot showing an RGB_DNA 3×2D view for a Rapiscan 515 scanner.
Figure 25A:
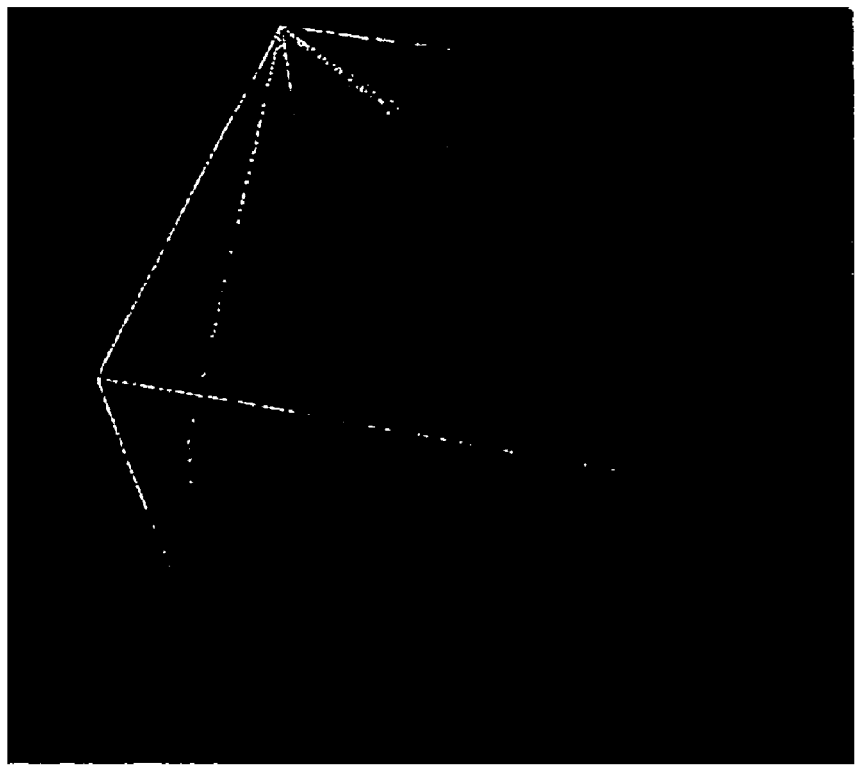
FIG. 25A is a plot showing an RGB_DNA 3D view for a Smith HiScan 6040i scanner.
Figure 25B:
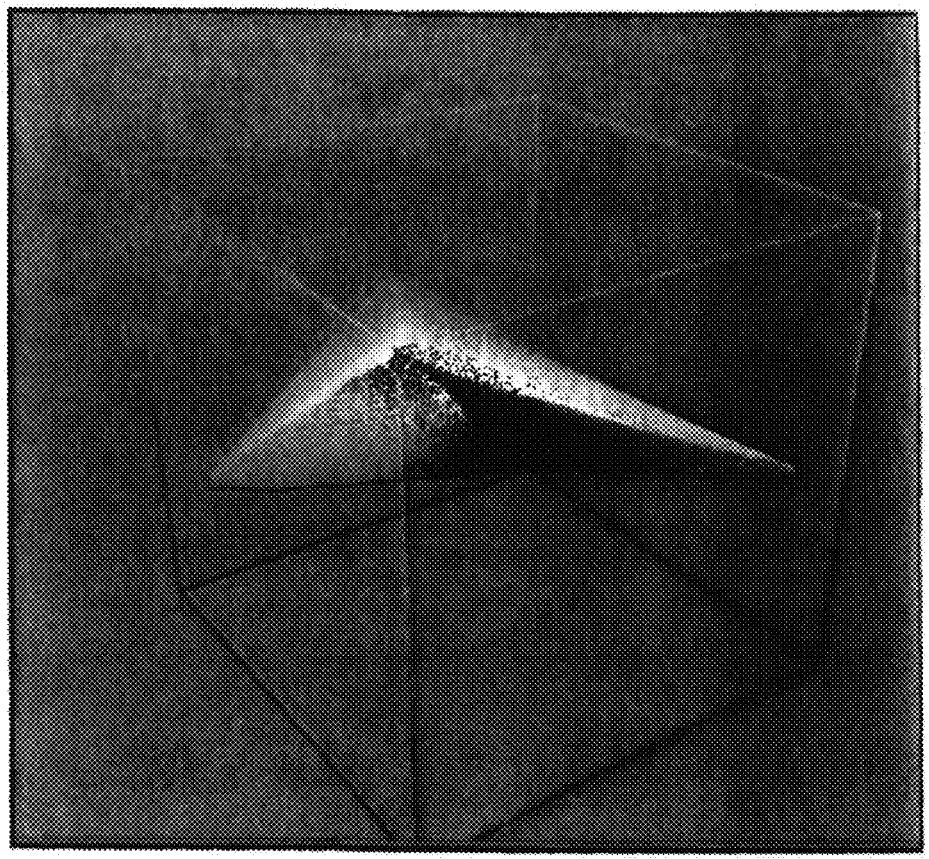
FIG. 25B is a plot showing an RGB_DNA 3D view for a Rapiscan 515 scanner.

An aspect of the present invention is the development of tools to visualize the set of unique colors, both as 3×2D projections to RG, GB and BR planes of the RGB cube, as shown in FIGS. 24A and 24B, and also as a 3D rotating view based on an OpenGL open source prototype, as shown in FIGS. 25A and 25B. FIGS. 24A and 24B are RGB_DNA 3×2D views for a Smith HiScan 6040i scanner and a Rapiscan 515 scanner, respectively. FIGS. 25A and 25B are 3D rotating views for a Smith HiScan 6040i scanner and a Rapiscan 515 scanner, respectively. The phrase "RGB_DN was assigned to the discovered color schemes, where term "DNA" was used because of the fact that all images, at least from the scanners of a particular model, will inherit this unique set of RGB colors.

As discussed above, it is possible to map RGB_DNA to (P,C) and as such build a bridge between ($Z_{eff}$, d) and RGB_DNA. This provides a uniform way to work with images of different vendors regardless of their color schemes.

Figure 26:
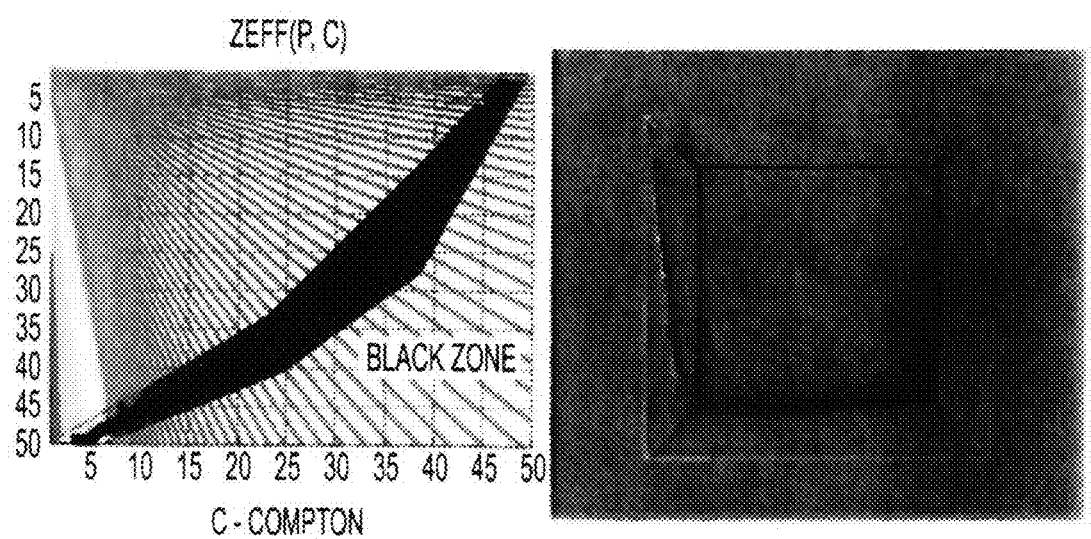
FIG. 26 are plots showing the modeling of 2D (P,C) space on the left and 3D RGB_DNA on the right for a Smith scanner.

FIG. 26 include plots of 2D (P,C) space (left plot) and 3D RGB_DNA (right plot) for a Smith scanner. It is clear that the point of origin (0,0) of (P,C) reflects the RGB point of (255, 255,255) on a 3D view of RGB_DNA. These points are responsible for the case of zero attenuation.

Figure 27:
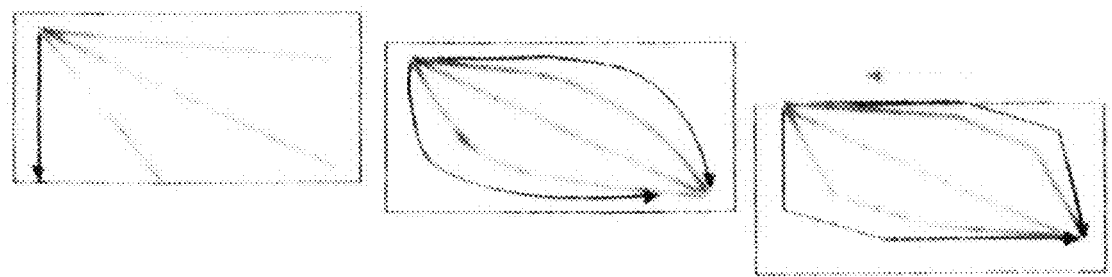
FIG. 27 are plots showing the sequence of (P,C) 2D elastic transformation to RGB_DNA (and back)

The next logical step consists of finding the relations between Black Pole (0,0,0) of the RGB_DNA and the Black Zone boundary of the (P,C) space. This point and the boundary are responsible for the scenario of the maximum possible measured attenuation. Beyond this point, the penetration is so weak that detectors "can not see it at all". In 3D RGB_DNA we have a single point-wise Black Pole, and in 2D (P,C) we have a stretched boundary. As shown in FIG. 27, the Black Zone boundary in (P,C) can be compressed/tightened to a single Black Pole or, what is more practical and convenient, the Black Pole of 3D RGB_DNA can be expanded and transformed to the curve, and together with unbent (piecewise-linear in our case) color curves of RGB_DNA, this 3D surface can be transformed to the 2D area similar to the 2D (P,C) space.

Figure 28:
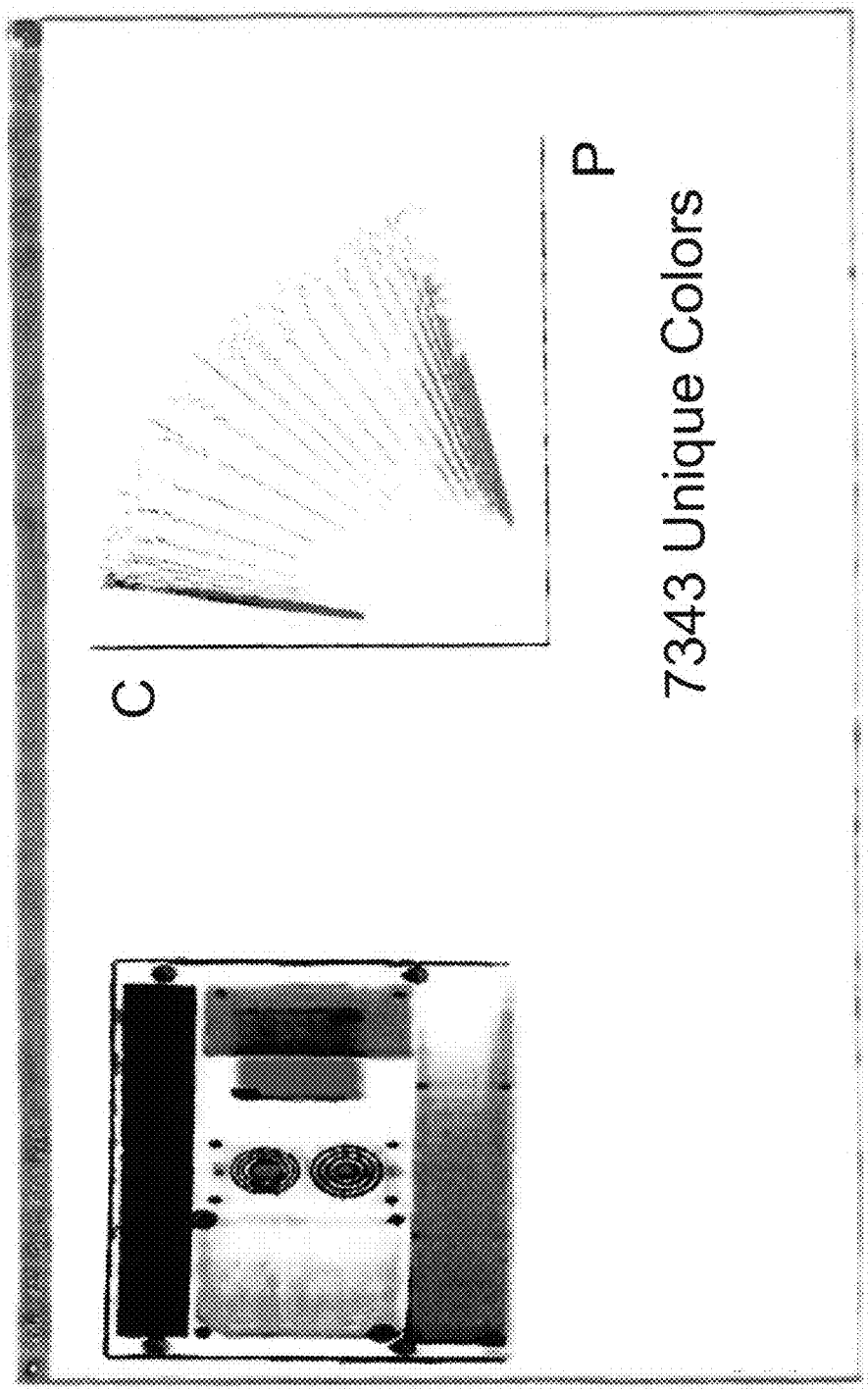
FIG. 28 is a plot of a 2D (P,C) representation of a Smith RGB_DNA set of unique colors.

The next step that needs to be performed, is noting that the color curves on the Smiths 3D RGB_DNA surface and the straight lines of the $Z_{eff}$=const on (P,C) plane are actually the same entities. They are the two-dimensional manifolds which are topologically equivalent, and can be mutually mapped by a one-to-one relationship. This mapping for Smiths scanner is shown in FIG. 28. The Rapiscan scanner color scheme can be mapped to the (P,C) space in the same manner as continuous elastic deformation.

Figure 29:
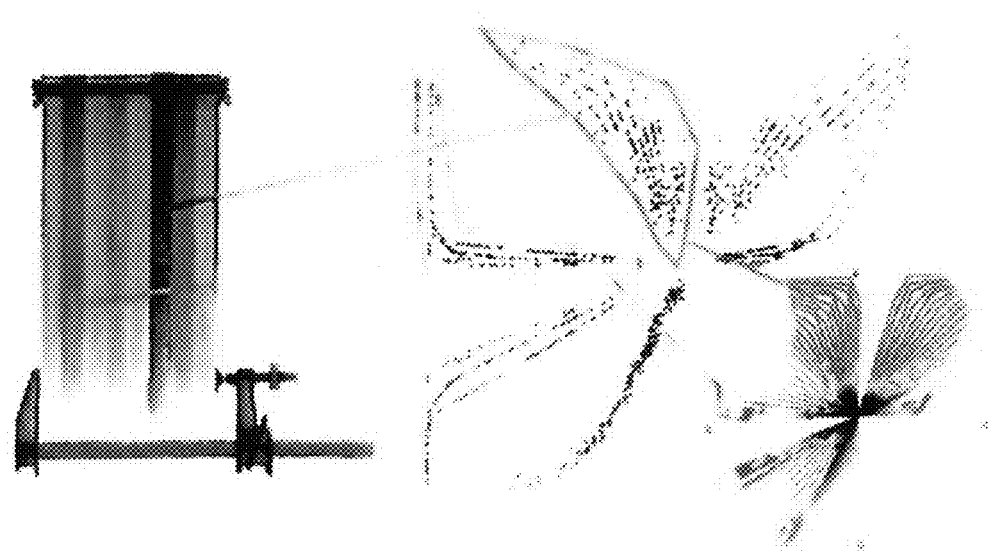
FIG. 29 is a plot showing the color curve(s) of Zeff=const on the Smith RGB_DNA.

The simplest way to confirm that this hypothesis is correct, is to measure the colors resulting from scanning of the same material of different thickness, e.g., a wedge. If the hypothesis is correct, one should see the colors forming one color curve on the Smith RGB_DNA. FIG. 29 shows a plot of the colors resulting from the scanning of a wedge on a Smith scanner, and verifies that the colors form one color curve on the Smith RGB_DNA.

Overlapping and Color Algebra

Figure 30:
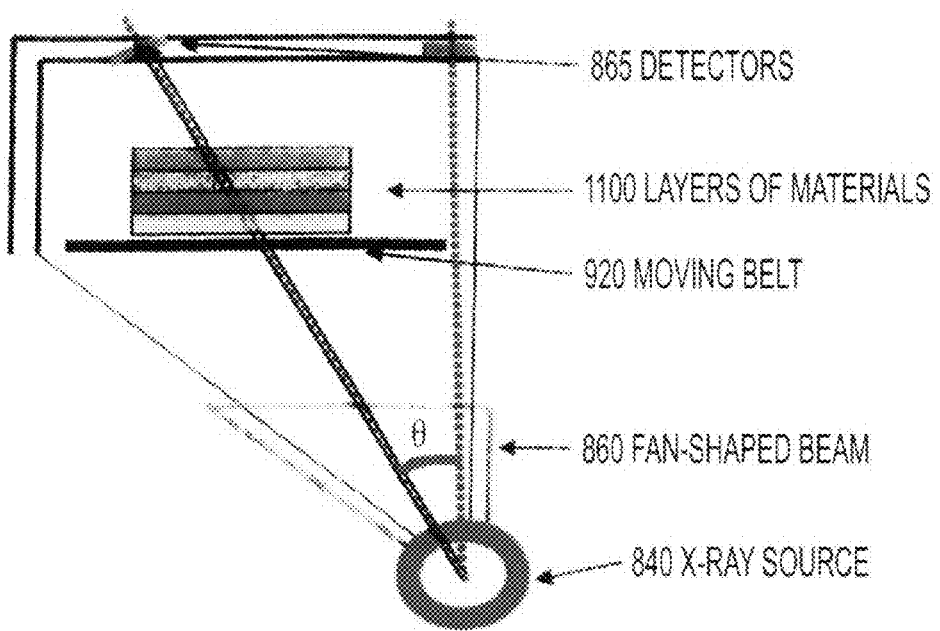
FIG. 30 is a schematic diagram of an x-ray scanner with an object to be scanned that consists of multiple layers of materials.

The case discussed above was for a uniform of thickness L with ρ=const, Z=const, A=const. Increasing the thickness L results in increasing the values of P and C. The case of a non-uniform layer composed of two or more uniform layers made of two or more different materials, as shown in FIG. 30, will now be addressed. In the case of two layers, the non-uniform layer (L) can be expressed as $L=L_1+L_2$.

For fixed θ, we have $$P = \int_{r_0}^{r_L(\theta)} k_p \frac{\rho(r)}{A(r)} Z^n(r) \cdot dr \quad (13)$$

$$= \sum_{k=1}^{2} \int_{L_k} k_p \frac{\rho_k}{A_k} Z_k^n \cdot dr$$

$$= \sum_{k=1}^{2} k_p \frac{\rho_k}{A_k} Z_k^n L_k$$

$$= \sum_{k=1}^{2} P_k = P_1 + P_2$$

$$C = \int_{r_0}^{r_L(\theta)} k_c \frac{\rho(r)}{A(r)} Z(r) \cdot dr \quad (14)$$

$$= \sum_{k=1}^{2} \int_{L_k} k_p \frac{\rho_k}{A_k} Z_k \cdot dr$$

$$= \sum_{k=1}^{2} k_p \frac{\rho_k}{A_k} Z_k L_k$$

$$= \sum_{k=1}^{2} C_k = C_1 + C_2$$

Figure 31:
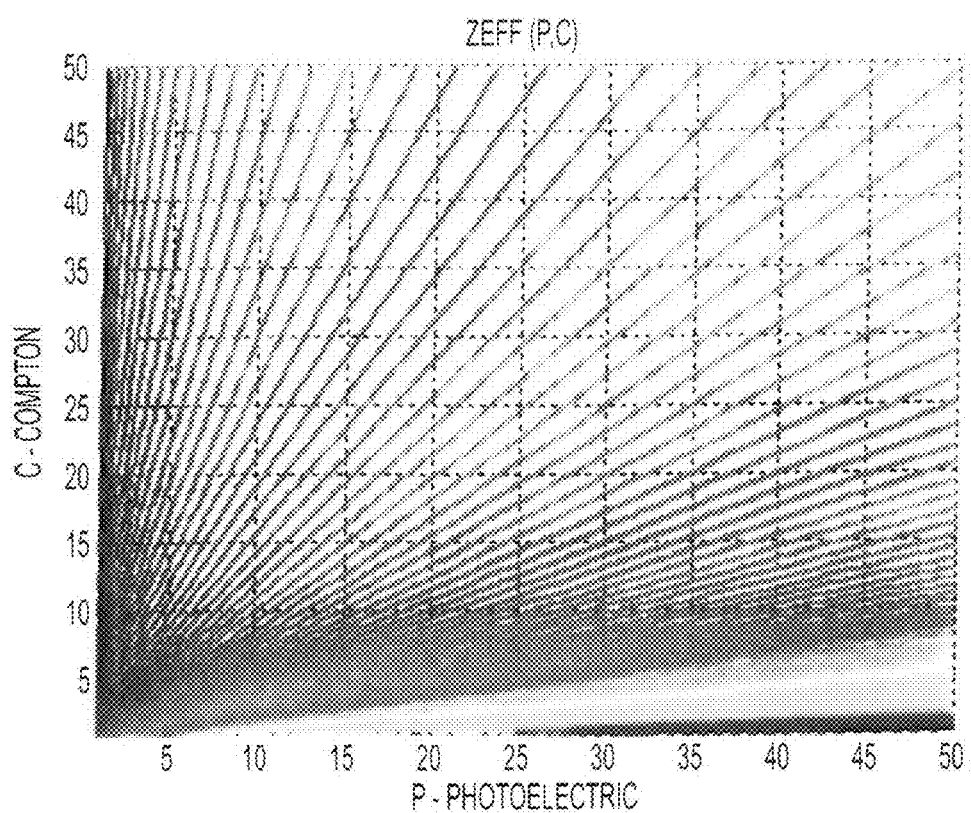
FIG. 31 is a plot showing 2D (P,C) space with vector addition.

The fact that $P=P_1+P_2$ and $C=C_1+C_2$ can be interpreted as vector addition in (P,C) space, as shown in FIG. 31.

Figure 32:
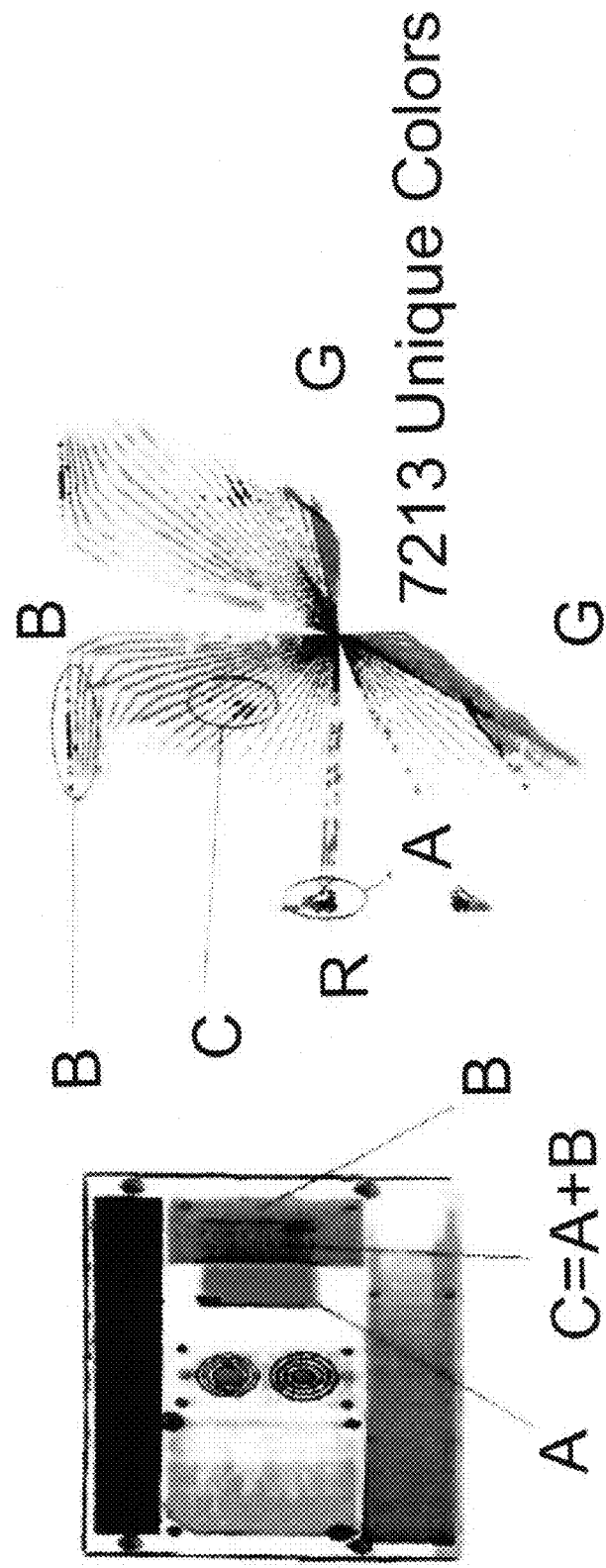
FIG. 32 is a plot showing a color algebra example for a Smith calibration bag consisting of overlapped materials.

In the scenario in which a one-to-one mapping from (P,C) to RGB_DNA and back exists, and in which their colors are known, the RGB_DNA color of the overlapped materials can be calculated, as shown in FIG. 32.

Using vector subtraction, the color of one of the two overlapped materials can be found if the color of the second one and color resulting from their overlapping is known. This technique of adding and subtracting colors is referred to herein as "color algebra." Color algebra is valid for any number K of overlapped layers:

$$P = \int_{r_0}^{r_L(\theta)} k_p \frac{\rho(r)}{A(r)} Z^n(r) \cdot dr \quad (15)$$

$$= \sum_{k=1}^{K} \int_{L_k} k_p \frac{\rho_k}{A_k} Z_k^n \cdot dr$$

$$= \sum_{k=1}^{K} k_p \frac{\rho_k}{A_k} Z_k^n L_k$$

$$= \sum_{k=1}^{K} P_k$$

$$C = \int_{r_0}^{r_L(\theta)} k_c \frac{\rho(r)}{A(r)} Z(r) \cdot dr \quad (16)$$

$$= \sum_{k=1}^{K} \int_{L_k} k_p \frac{\rho_k}{A_k} Z_k \cdot dr$$

$$= \sum_{k=1}^{K} k_p \frac{\rho_k}{A_k} Z_k L_k$$

$$= \sum_{k=1}^{K} C_k$$

Equations (11) and (12) above express the effective atomic number Z and density d as functions of P and C for a single uniform layer of a material. In the case of K layers of different materials with the effective atomic numbers $Z_k$ and densities $d_k$ k=1, ..., K, the formulas for Z and d can be derived from $$P_k = k_p \frac{\rho_k}{A_k} Z_k^n L_k \quad (17)$$

$$C_k = k_p \frac{\rho_k}{A_k} Z_k L_k \quad (18)$$

and $$P = \sum_{k=1}^{K} P_k \tag{19}$$

$$C = \sum_{k=1}^{K} C_k \tag{20}$$

using substitution $$d_k = \frac{\rho_k}{A_k} L_k$$

as a density for the layer k:

$$P = k_p d \cdot Z^n = \sum_{k=1}^{K} k_p d_k Z_k^n \tag{21}$$

$$C = k_c d \cdot Z = \sum_{k=1}^{K} k_p d_k Z_k, \tag{22}$$

the expression for the resulting Z and d can be found:

$$Z = \left( \frac{\sum_{k=1}^{K} d_k Z_k^n}{\sum_{k=1}^{K} d_k Z_k} \right)^{1/(n-1)} \tag{23}$$

$$d = \frac{\left[ \left( \sum_{k=1}^{K} d_k Z_k \right)^n \right]^{1/(n-1)}}{\sum_{k=1}^{K} d_k Z_k^n} \tag{24}$$

Equations (23) and (24) are the mathematical expressions for decomposition of the initial Z and d into several components with different $Z_k$ and $d_k$, k=1, ..., K. These formulas built the foundation for the potential solution of the inverse problem of multi-layer material detection in x-ray scanning machines.

Limitation of Visual Perception of Digital Images

Explosive detection using the methodology described above has been tested on images stored in 24-bit bitmap (bmp) format. These images were supposed to be exact copies from the computer screen of x-ray scanners. However, in several cases, the images were not what they were supposed to be despite the fact that the images passed visual inspection by humans. Identical for human perception but different in their pixel's RGB content, these images confused the system functionality and had not been caught until they were forced to go through RGB_DNA viewers.

Figure 33:
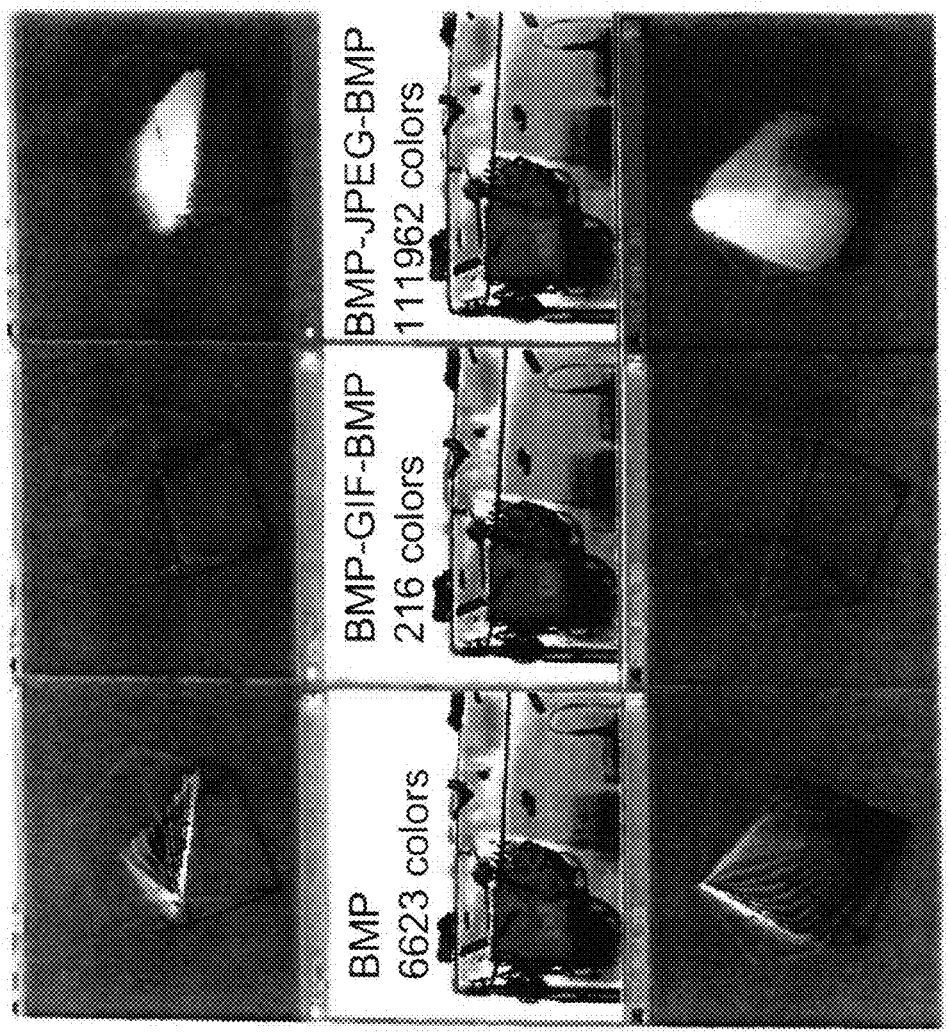
FIG. 33 are examples of images with their 3D RGB_DNA views.

FIG. 33 shows examples of images with their 3D RGB_DNA views. Only the image on the far left is in correct original RGB_DNA colors. The other two images are visually undistinguished from first one. Nevertheless, they are in fact bmp images converted back from gif and jpeg conversions of an original bmp image.

Figure 34:
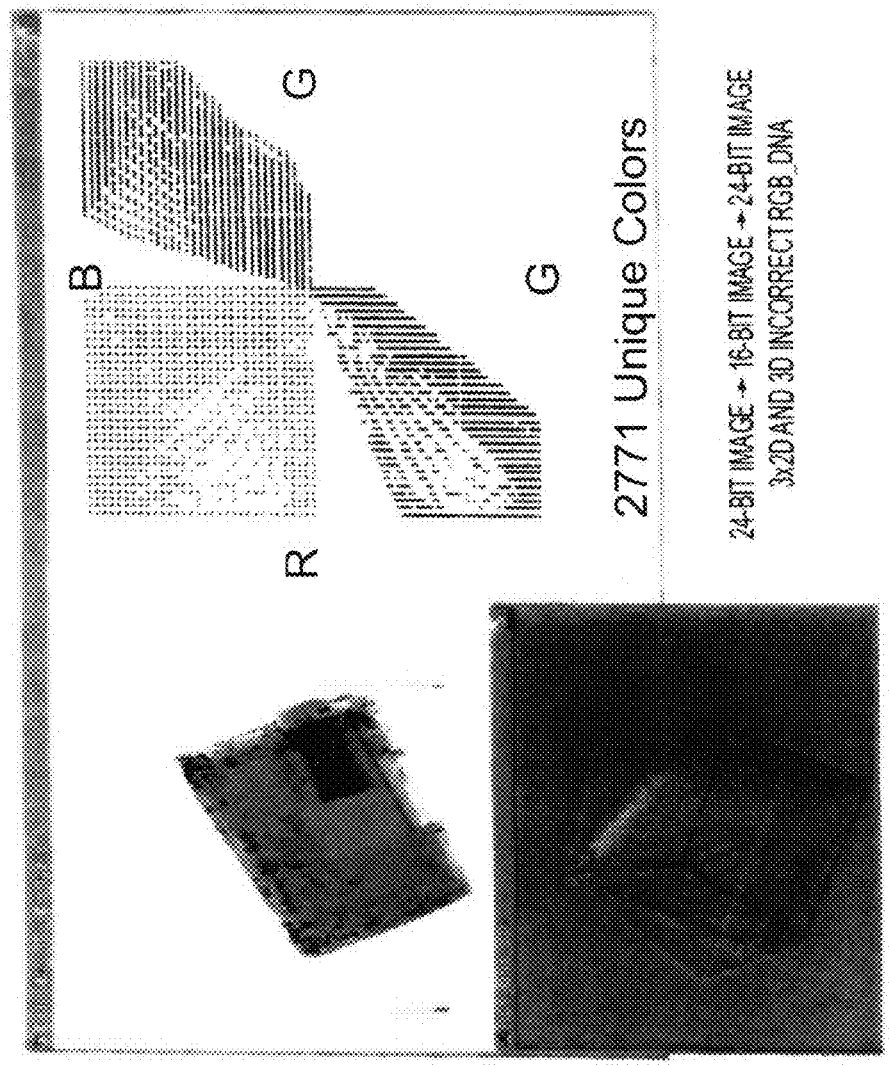
FIG. 34 are plots showing incorrect RGB_DNA as a result of accidental conversion from 24-bit bmp to 16-bit bmp and back to 24 bit bmp.

Another example, shown in FIG. 34, shows accidental conversion from 24-bit bmp to 16-bit and back. FIGS. 34 and 32 can be compared to see the difference between the incorrect RGB_DNA and the correct one.

The fact that number of RGB_DNA colors in color images of dual energy x-ray scanners is fixed for each model and are much less than 16,777,216 RGB triplets in 24-bit bmp, it is possible to make automated inspection of incoming images without the actual visual review of their RGB_DNA (3×2D or 3D). This process can detect the presence of images not created with that x-ray scanner or the scanner is out of calibration. The existence of RGB_DNA itself as a limited subset of the entire 24-bit RGB set makes it possible. The component designed and implemented for this purpose performs a fast search through already collected RGB_DNA sets for each pixel of an incoming image, and assures that the system will not be confused.

The Colors of $Z_{eff}$=const—z-lines Extraction

The color scheme of the Smith scanner is comprised of 29 color curves that are stretched from white RGB pole (255, 255,255) to black pole (0,0,0). There is one more line of gray colors used for edge enhancement, but these colors do not represent any materials. As discussed above, the color component can determine that the RGB color of a pixel belongs to the RGB_DNA whole set of colors, but it can not determine which one of the 29 curves this color is a part.

As discussed above, each color curve represents the line in (P,C) space with $Z_{eff}$=cost. They are referred to herein as "z-lines." If the colors of each line are known, it is possible to exploit this fact for at least two very useful applications. The first application is the physics-based feature vectors computation in pattern classification algorithms, which will be discussed in more detail below.

The second application uses z-lines for removing or keeping selected materials from an image. This is a much more flexible image filtering tool than so called "organic and metal stripping" provided by x-ray scanner manufacturers, as will be discussed in more detail below.

Figure 35:
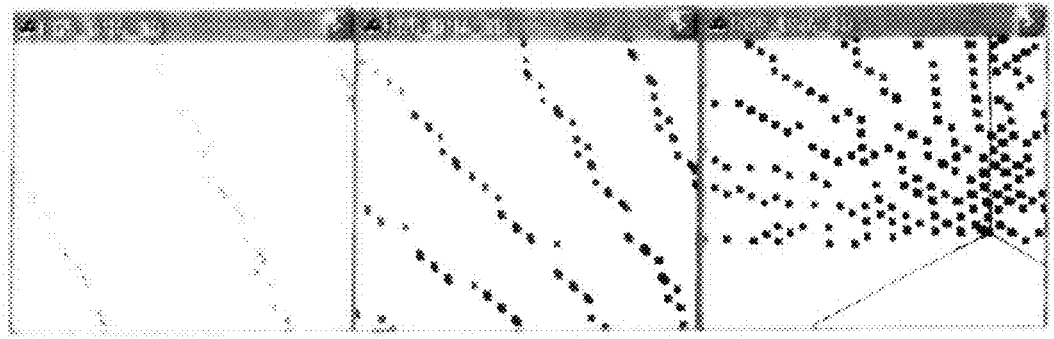
FIG. 35 are plots showing the fine structure of z-lines on their way from the central region of the 3D RGB cube towards the black pole with RGB=(0,0,0)

Z-lines are clearly visible on RGB_DNA 3D view (see FIGS. 25A and 26) and they can be extracted without any difficulties. Nevertheless, there are several confusing facts. For example, in the areas close to polar (white and black) zones, the number of RGB_DNA colors can be less than 29 (the actual number of lines). Another surprise is the fact that z-lines themselves are actually not lines. They are integer approximation of the ideal continuous 3D lines by the finite set of points with integer three coordinates. Therefore, there are cases where three dimensional aliasing resembles 3D stares in RGB cube. In such cases, the procedure of extracting RGB coordinates of points for z-lines is not straightforward. FIG. 35 shows the fine structure of z-lines on their way from the central region of the 3D RGB cube towards the black pole with RGB=(0,0,0). As can be seen, the aliasing gets worse closer to poles. The picture appears so complicated it is difficult to determine whether the 3D RGB cube is the native home for z-lines.

Figure 36:
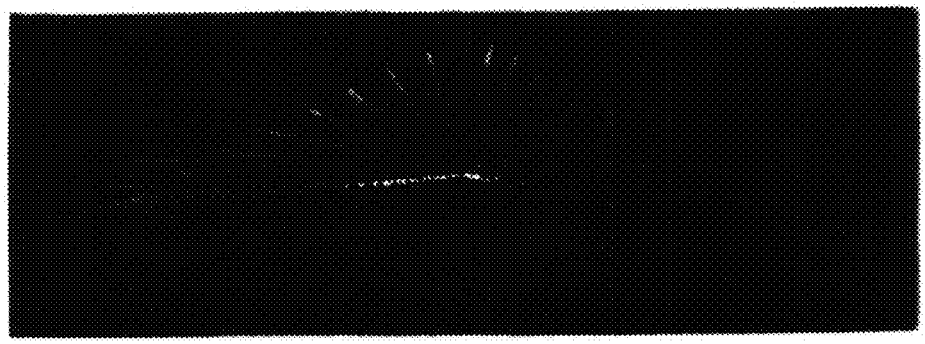
FIG. 36 is a plot showing the z-lines shown in FIG. 35 from the point in RGB space lying on the prolongation of the major diagonal of RGB cube FIG. 37 are plots showing examples of extracted z-lines and theirs colors in 3×2D RGB_DNA view.

One can look at z-lines from another point. That is, from the point in RGB space lying on the prolongation of the major diagonal of RGB cube, as shown in FIG. 36. One can see that each z-line seems to be a plane line, and the plane goes through the major diagonal. In a cylindrical system of coordinates (z, r, θ) with z coincided with the major diagonal, each z-line has its very narrow sector of the angular coordinates θ for all its points. One can say with good accuracy that the z-line for a particular $Z_{eff}$=const contains the points with θ=coast. Therefore, the cylindrical system of coordinates is more natural or, at least, more convenient.

In this system, the angular coordinate θ is an invariant for all points of the same z-line. This means that HSI color space is more suitable, or more natural, for z-lines than RGB, and extraction of z-line's colors is a straightforward operation universal, not only for the Smith color scheme, but for the Rapiscan color scheme as well.

Figure 37:
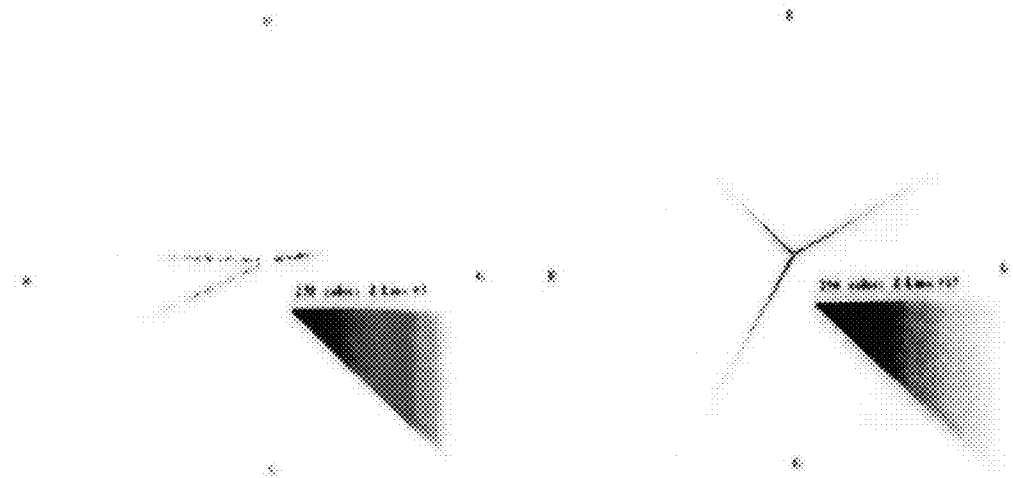
Figure 38:
FIG. 38 are plots showing extracted z-lines number 1, 7 and 25 and theirs colors in 3D RGB_DNA view.

FIG. 37 shows z-line numbers 3 and 15 together with their respective colors. FIG. 38 shows a 3D view for extracted z-line numbers 1, 7 and 25 with respective colors.

Having z-lines extracted and sorted by intensity value I of HSI, one is able to navigate in color RGB_DNA space like in (P,C) space. For any two colors, one can say which one has a greater effective atomic number $Z_{eff}$ corresponding to their colors or, in case of the same $Z_{eff}$, one can say which one is more dense. Moreover, one can extend the meaning of hue coordinate H of HSI to be the carrier of $Z_{eff}$ and intensity I to be responsible for density of a material.

Saturation S is thus far unemployed. It can be an unemployed free parameter (and is for Smith and Rapiscan scanners) responsible for carrying the proprietary "look and feel" of the color scheme. Colors of the same objects can appear differently on Smith and Rapiscan scanners having the same or close H and I, but different S.

Physics Based Feature Vectors—z-metrics

Results of feature extraction for color images depends on the colors of an image, the color scheme (RGB, HIS or other) and the algorithm of the features computation itself. Mapping z-lines and their ordered colors to (P,C) space opens up an opportunity to exclude color from the feature extraction process. Instead of using three variables of a particular color space, such as R, G, and B in RGB, to feed the feature extraction algorithm, two variables of (P,C) can be used.

Figure 39:
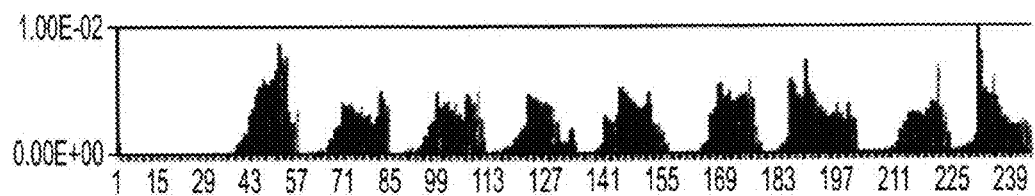
FIG. 39 is a plot showing the fragment of typical 25 bin's z-metrics for $1^{st}$ nine z-lines.

Two dimensions reduce complexity. Unlike of points in color spaces, the points in (P,C) space have clear physical meaning. P stands for Photoelectric fraction of attenuation and C stands for Compton attenuation. To exploit these advantages, the methodology of z-metrics implemented. Z-metrics is actually the set of 29 histograms, one per each z-line. It can be computed with bins or without bins, weighed or not. Experiments have shown that this metric alone is as effective as an assembly of several metrics based on traditional features of color images. FIG. 39 is a plot of fragment of typical 25 bin's z-metrics for the first 9 z-lines.

Beyond Organic and Metal Stripping—z-filters

Figure 40:
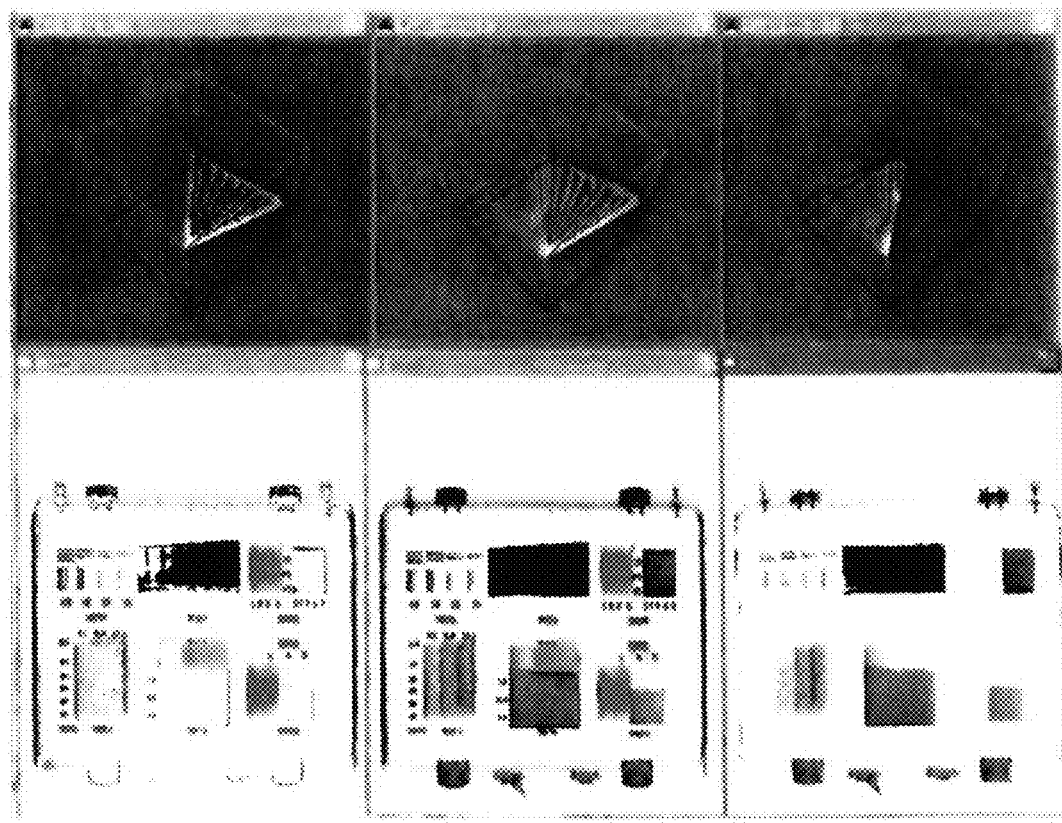
FIG. 40 are organic only, normal and metal only images and their respective 3D RGB_DNA.
Figure 41:
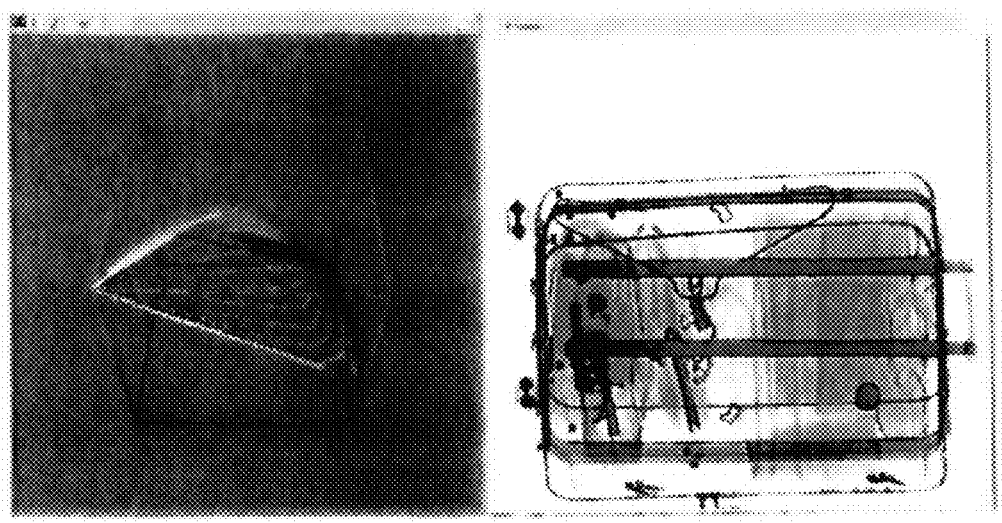
FIG. 41 shows an original image and its RGB_DNA with no filters applied.
Figure 42:
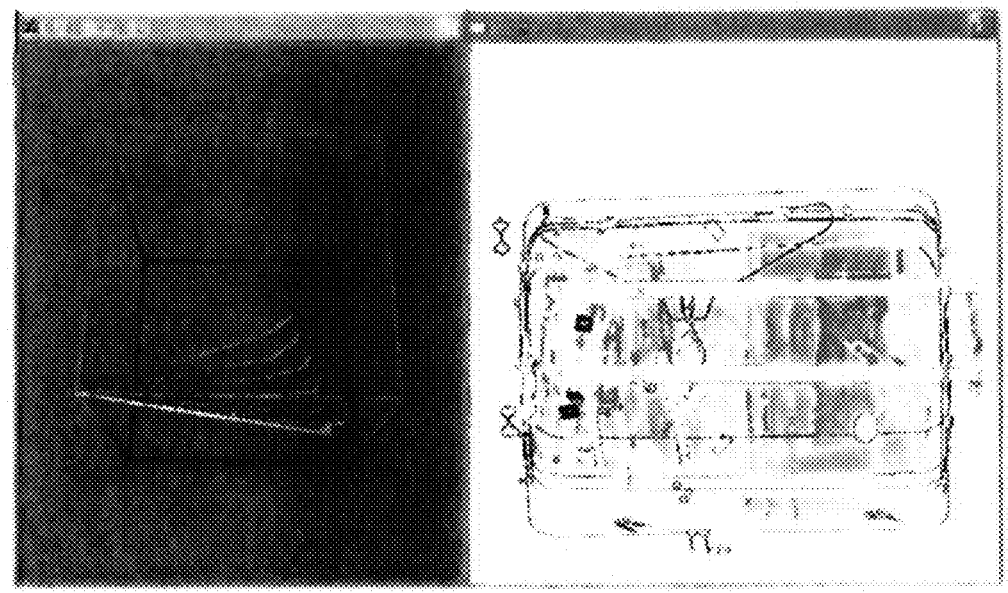
FIG. 42 shows the image of FIG. 41 with a z-filter applied to keep light organics.
Figure 43:
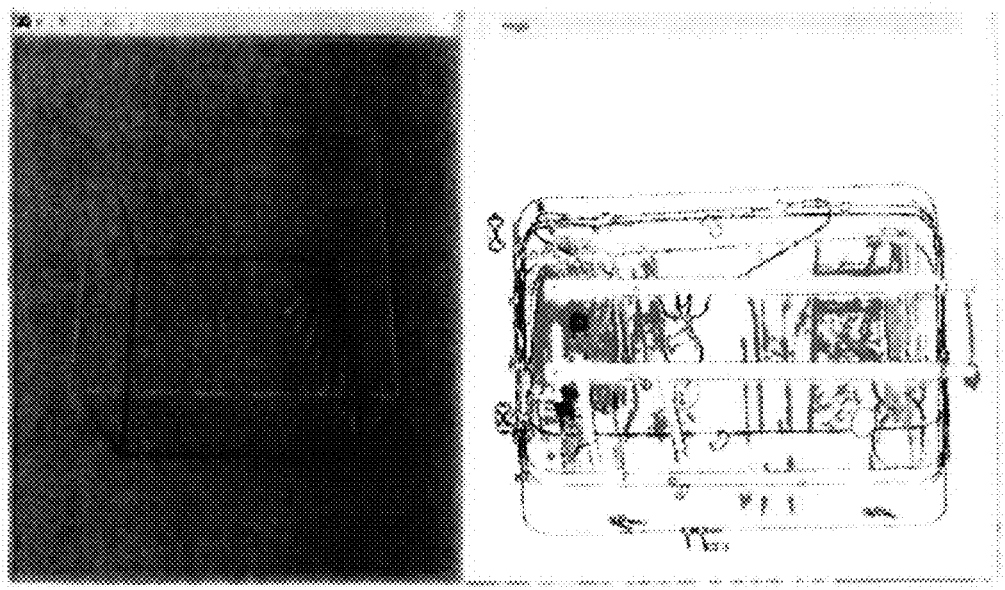
FIG. 43 shows the image of FIG. 41 with a z-filter applied to keep heavy organics.
Figure 44:
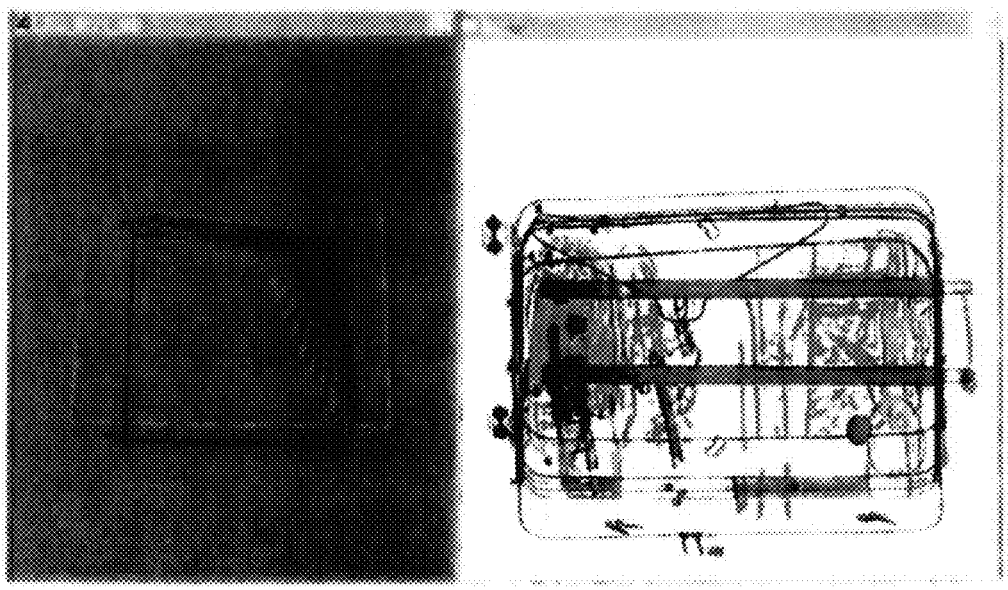
FIG. 44 shows the image of FIG. 41 with a z-filter applied to keep heavy organics and metal.
Figure 45:
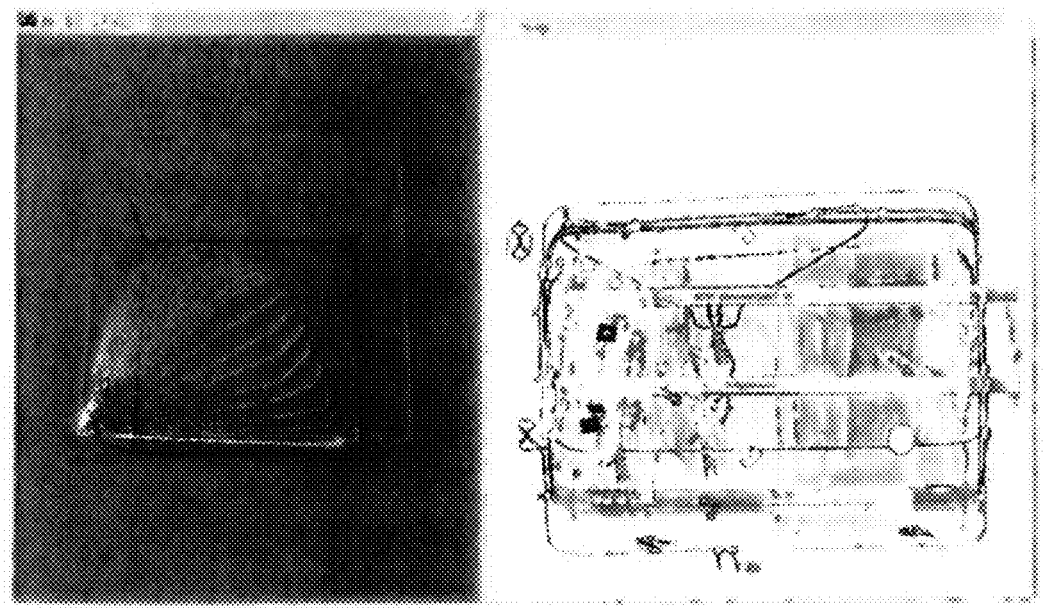
FIG. 45 shows the image of FIG. 41 with a z-filter applied to keep light organics and metal.

Manufacturers of dual energy x-ray machines advertise the "material stripping" feature of their scanners. FIG. 40 shows an example of this feature, together with 3D views of the respective RGB_DNA. It is obvious that stripping is a result of simple color replacement of colors from "orange" or "blue" z-lines by gray colors, and it can be considered as a manufacturer's proof of the idea that z-lines are actually the lines of $Z_{eff}$=cont.

Organic or metal stripping, as is easy to see, are only very limited simple special cases from an unlimited number of other possibilities. The colors mapped to any region in (P,C) space can be replaced, i.e., z-filtered. Alternatively, they can be processed in some other way. The key point is the mapping itself. If one has the mapping, one can apply z-filters of any kind, like those shown in FIGS. 41-45.

The image analysis system 130 can be implemented with a general purpose computer. However, it can also be implemented with a special purpose computer, programmed microprocessor or microcontroller and peripheral integrated circuit elements, ASICs or other integrated circuits, hardwired electronic or logic circuits such as discrete element circuits, programmable logic devices such as FPGA, PLD, PLA or PAL or the like. In general, any device on which a finite state machine capable of executing code for implementing the process steps of FIG. 7 can be used to implement the image analysis system 130.

Input channel 110 may be, include or interface to any one or more of, for instance, the Internet, an intranet, a PAN (Personal Area Network), a LAN (Local Area Network), a WAN (Wide Area Network) or a MAN (Metropolitan Area Network), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34bis analog modem connection, a cable modem, and ATM (Asynchronous Transfer Mode) connection, or an FDDI (Fiber Distributed Data Interface) or CDDI (Copper Distributed Data Interface) connection. Input channel 110 may furthermore be, include or interface to any one or more of a WAP (Wireless Application Protocol) link, a GPRS (General Packet Radio Service) link, a GSM (Global System for Mobile Communication) link, CDMA (Code Division Multiple Access) or TDMA (Time Division Multiple Access) link such as a cellular phone channel, a GPS (Global Positioning System) link, CDPD (Cellular Digital Packet Data), a RIM (Research in Motion, Limited) duplex paging type device, a Bluetooth radio link, or an IEEE 802.11-based radio frequency link. Input channel 110 may yet further be, include or interface to any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection.

The foregoing embodiments and advantages are merely exemplary, and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. Various changes may be made without departing from the spirit and scope of the present invention, as defined in the following claims.

What is claimed is:

1. A method of creating a divergence transform for identifying a feature of interest in hyperspectral data, comprising:
   (1) selecting a point operation;
   (2) performing the point operation on a subset of the hyperspectral data that contains a known feature that is substantially similar to said feature of interest;
   (3) adjusting the point operation if the point operation does not bifurcate the known feature;
   (4) performing the adjusted point operation on the subset of the hyperspectral data; and
   (5) repeating steps (3) and (4) until a resulting point operation bifurcates the known feature, whereby the resulting point operation corresponds to the divergence transform.

2. The method of claim 1, wherein the point operation is at least partially a nonlinear point operation.

3. The method of claim 1, wherein the point operation comprises at least one nodal point.

4. The method of claim 3, wherein the at least one nodal point is set so as to effect the bifurcation of the feature of interest.

5. The method of claim 3, wherein the nodal point is set so as to reduce background clutter in at least some of the hyperspectral data in the subset of hyperspectral data.

6. The method of claim 1, wherein the resulting point operation is adapted to maintain an integrity of the feature of interest when the resulting point operation bifurcates the feature of interest.

7. The method of claim 1, wherein the hyperspectral data comprises nonparametric hyperspectral data.

8. The method of claim 1, wherein the hyperspectral data comprises two-dimensional hyperspectral data.

9. The method of claim 1, wherein the hyperspectral data comprises three-dimensional hyperspectral data.

10. The method of claim 1, wherein the hyperspectral data comprises x-ray hyperspectral data.

11. A method of creating a series of divergence transforms for identifying a feature of interest in hyperspectral data, comprising:
   (1) selecting a series of point operations;
   (2) performing the series of point operations sequentially on a subset of the hyperspectral data that contains a known feature that is substantially similar to said feature of interest;
   (3) adjusting the series of point operations if the series of point operations do not bifurcate the known feature;
   (4) performing the adjusted series of point operations on the subset of the hyperspectral data; and
   (5) repeating steps (3) and (4) until a resulting series of point operations bifurcates the known feature, whereby the resulting series of point operations correspond to the series of divergence transforms.

12. The method of claim 11, wherein the series of point operations are at least partially non-linear point operations.

13. The method of claim 11, wherein each of the point operations in the series of point operations comprises at least one nodal point.

14. The method of claim 13, wherein the nodal points are set so as to effect the bifurcation of the feature of interest.

15. The method of claim 13, wherein the nodal points are set so as to reduce background clutter in at least some of the hyperspectral data in the subset of hyperspectral data.

16. The method of claim 11, wherein the resulting series of point operations are adapted to maintain an integrity of the feature of interest when the resulting series of point operations bifurcates the feature of interest.

17. The method of claim 11, wherein the hyperspectral data comprises nonparametric hyperspectral data.

18. The method of claim 11, wherein the hyperspectral data comprises two-dimensional hyperspectral data.

19. The method of claim 11, wherein the hyperspectral data comprises three-dimensional hyperspectral data.

20. The method of claim 11, wherein the hyperspectral data comprises x-ray hyperspectral data.

21. A method of creating a divergence transform for identifying a feature of interest in hyperspectral data, comprising:
   (1) assimilating a database of hyperspectral data, wherein at least some of the hyperspectral data contains a known feature that is substantially similar to said feature of interest;
   (2) selecting a point operation;
   (3) performing the point operation on a subset of the hyperspectral data that contains a known feature that is substantially similar to said feature of interest;
   (4) adjusting the point operation if the point operation does not bifurcate the known feature;
   (5) performing the adjusted point operation on the subset of the hyperspectral data; and
   (6) repeating steps (4) and (5) until a resulting point operation bifurcates the known feature, whereby the resulting point operation corresponds to the divergence transform.

22. The method of claim 21, wherein the point operation is at least partially a nonlinear point operation.

23. The method of claim 21, wherein the point operation comprises at least one nodal point.

24. The method of claim 23, wherein the at least one nodal point is set so as to effect the bifurcation of the feature of interest.

25. The method of claim 23, wherein the nodal point is set so as to reduce background clutter in at least some of the hyperspectral data in the subset of hyperspectral data.

26. The method of claim 21, wherein the resulting point operation is adapted to maintain an integrity of the feature of interest when the resulting point operation bifurcates the feature of interest.

27. The method of claim 21, wherein the hyperspectral data comprises nonparametric hyperspectral data.

28. The method of claim 21, wherein the hyperspectral data comprises two-dimensional hyperspectral data.

29. The method of claim 21, wherein the hyperspectral data comprises three-dimensional hyperspectral data.

30. The method of claim 21, wherein the hyperspectral data comprises x-ray hyperspectral data.

31. A method of creating a series of divergence transforms for identifying a feature of interest in hyperspectral data, comprising:
   (1) assimilating a database of hyperspectral data, wherein at least some of the hyperspectral data contains a known feature that is substantially similar to said feature of interest;
   (2) selecting a series of point operations;
   (3) performing the series of point operations sequentially on a subset of the hyperspectral data that contains a known feature that is substantially similar to said feature of interest;
   (4) adjusting the series of point operations if the series of point operations do not bifurcate the known feature;
   (5) performing the adjusted series of point operations on the subset of the hyperspectral data; and
   (6) repeating steps (4) and (5) until a resulting series of point operations bifurcates the known feature, whereby the resulting series of point operations correspond to the series of divergence transforms.

32. The method of claim 31, wherein the series of point operations are at least partially non-linear point operations.

33. The method of claim 31, wherein each of the point operations in the series of point operations comprises at least one nodal point.

34. The method of claim 33, wherein the nodal points are set so as to effect the bifurcation of the feature of interest.

35. The method of claim 33, wherein the nodal points are set so as to reduce background clutter in at least some of the hyperspectral data in the subset of hyperspectral data.

36. The method of claim 31, wherein the resulting series of point operations are adapted to maintain an integrity of the feature of interest when the resulting series of point operations bifurcates the feature of interest.

37. The method of claim 31, wherein the hyperspectral data comprises nonparametric hyperspectral data.

38. The method of claim 31, wherein the hyperspectral data comprises two-dimensional hyperspectral data.

39. The method of claim 31, wherein the hyperspectral data comprises three-dimensional hyperspectral data.

40. The method of claim 31, wherein the hyperspectral data comprises x-ray hyperspectral data.

* * * * *